United States Patent [19]

Kanazawa et al.

[11] Patent Number: 5,253,278
[45] Date of Patent: Oct. 12, 1993

[54] FUEL ASSEMBLY, CHANNEL BOX, PRODUCTION METHOD OF CHANNEL BOX, AND CORE OF NUCLEAR REACTOR

[75] Inventors: Toru Kanazawa, Hitachi; Osamu Yokomizo, Ibaraki; Shin-ichi Kashiwai, Hitachi; Akihito Orii, Hitachi; Koji Nishida, Hitachi; Tatsuo Hayashi, Hitachi; Junjiro Nakajima, Hitachi, all of Japan

[73] Assignee: Hitachi, Ltd., Tokyo, Japan

[21] Appl. No.: 705,723

[22] Filed: May 24, 1991

[30] Foreign Application Priority Data

May 25, 1990 [JP] Japan ................... 2-133791

[51] Int. Cl.$^5$ .............................................. G21C 3/32
[52] U.S. Cl. ................. 376/434; 376/439; 376/444; 376/448
[58] Field of Search ............... 376/443, 439, 444, 448, 376/434, 438, 457; 976/DIG. 103, DIG. 108, DIG. 109

[56] References Cited

U.S. PATENT DOCUMENTS

| | | | |
|---|---|---|---|
| 3,715,274 | 2/1973 | Venier et al. ................. | 376/440 |
| 4,110,160 | 8/1978 | Hayashi et al. .............. | 376/462 |
| 4,514,358 | 4/1985 | Borrman et al. .............. | 376/362 |
| 4,749,543 | 6/1988 | Crowther et al. ............. | 376/443 |
| 4,749,544 | 6/1988 | Crowther et al. ............. | 376/443 |
| 4,889,684 | 12/1989 | Johansson .................... | 376/444 |
| 4,897,241 | 1/1990 | Anthony ....................... | 376/438 |

FOREIGN PATENT DOCUMENTS 1-13075 3/1989 Japan .

Primary Examiner—Donald P. Walsh
Assistant Examiner—Meena Chelliah
Attorney, Agent, or Firm—Antonelli, Terry, Stout & Kraus

[57] ABSTRACT

A fuel assembly included a plurality of fuel rods, fuel spacers for maintaining gaps between the fuel rods and a channel box. The channel box includes spacer support portions projecting inwardly from an inner surface of the channel box and supporting the fuel spacer in a transverse direction and creep deformation inhibition portions disposed at the lower end portion of the channel box and projecting inwardly. The distance between the spacer support portions disposed to oppose one another in a horizontal direction is smaller than the distance between the creep deformation inhibition portions opposing one another in the horizontal direction.

33 Claims, 19 Drawing Sheets

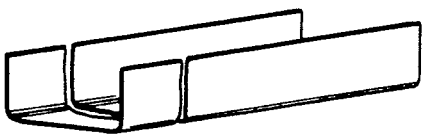
FIG. 8(a)
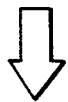
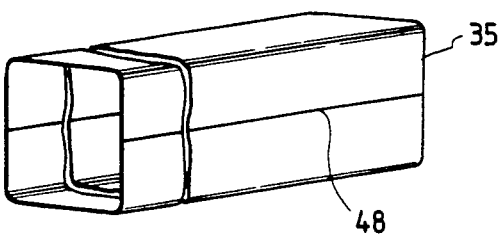
FIG. 8(b)
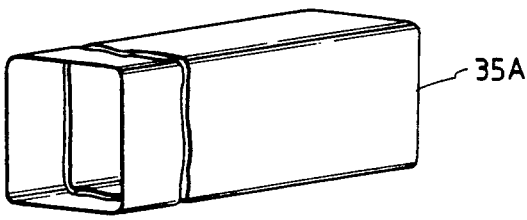
FIG. 8(c)
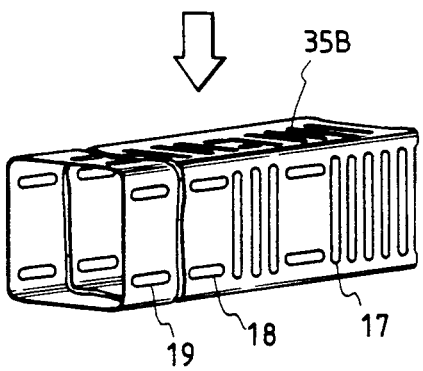
FIG. 8(d)
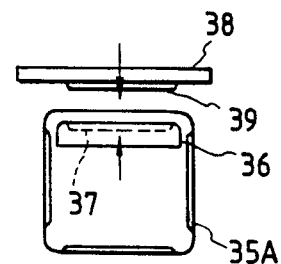
FIG. 8(e)

COOLING WATER FLOW

COOLING WATER FLOW

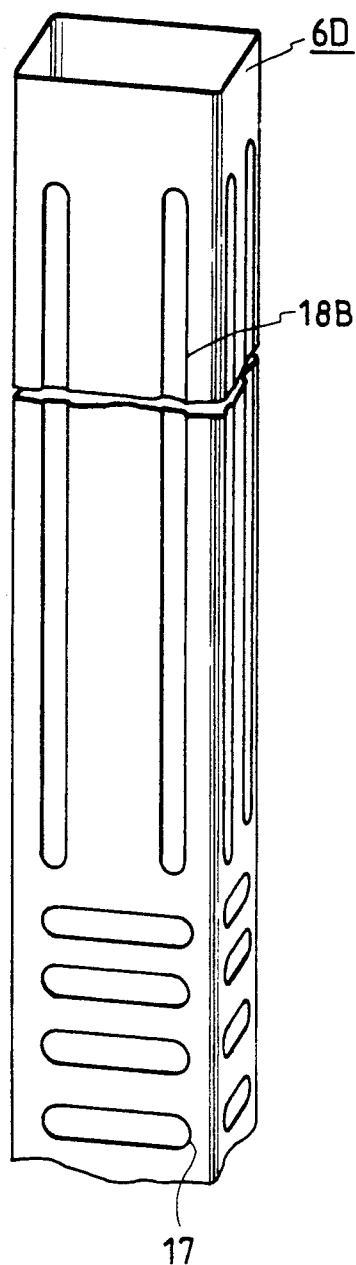 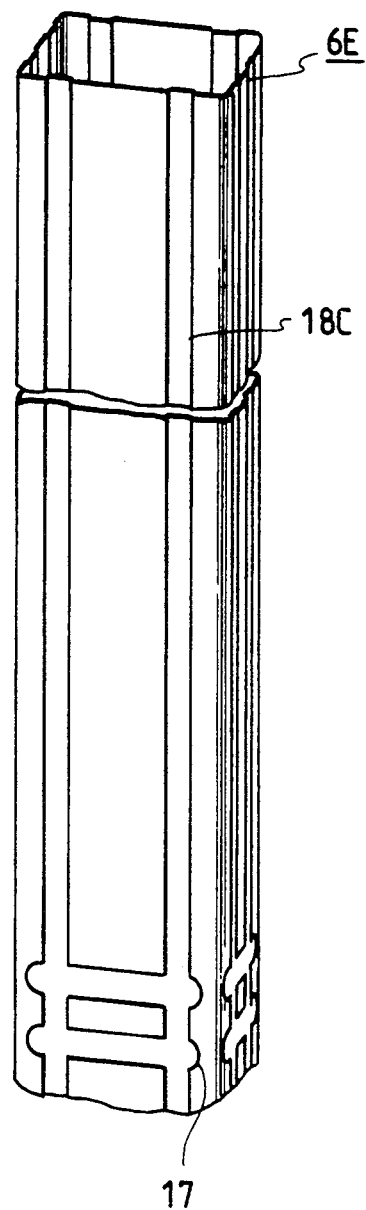

FIG. 25
FIG. 26
FIG. 27
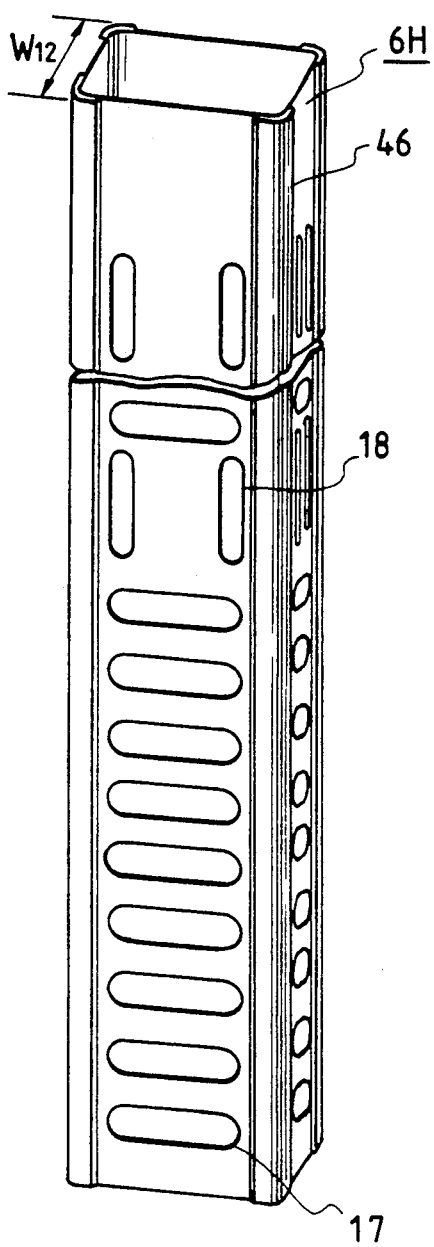
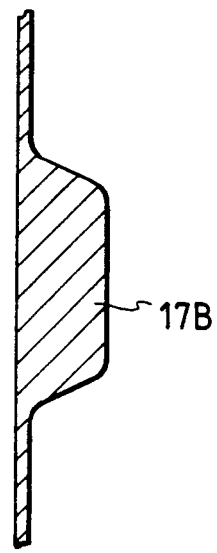
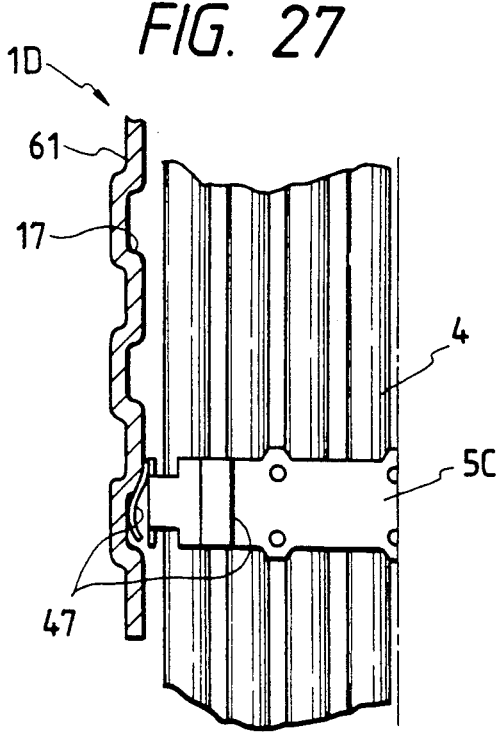

FIG. 23
FIG. 24
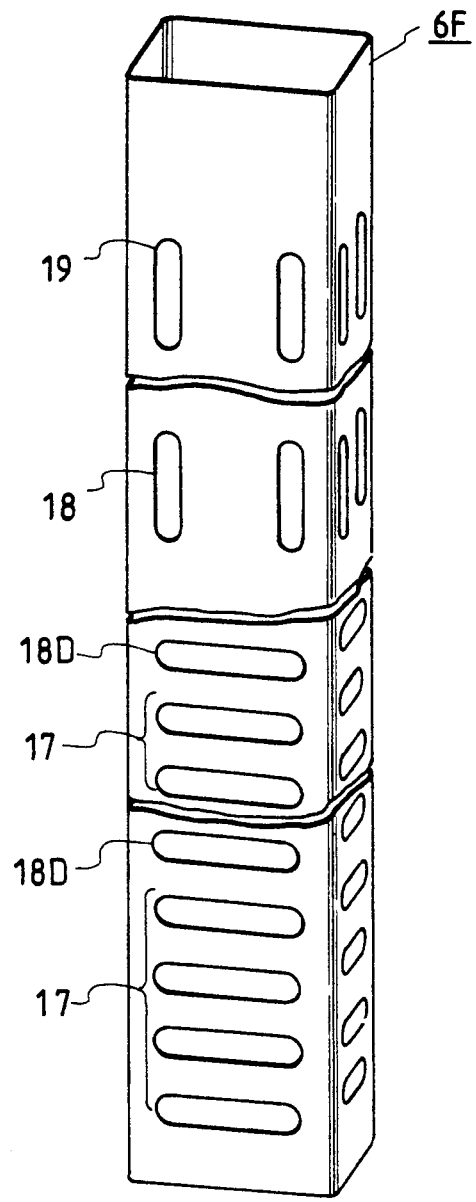
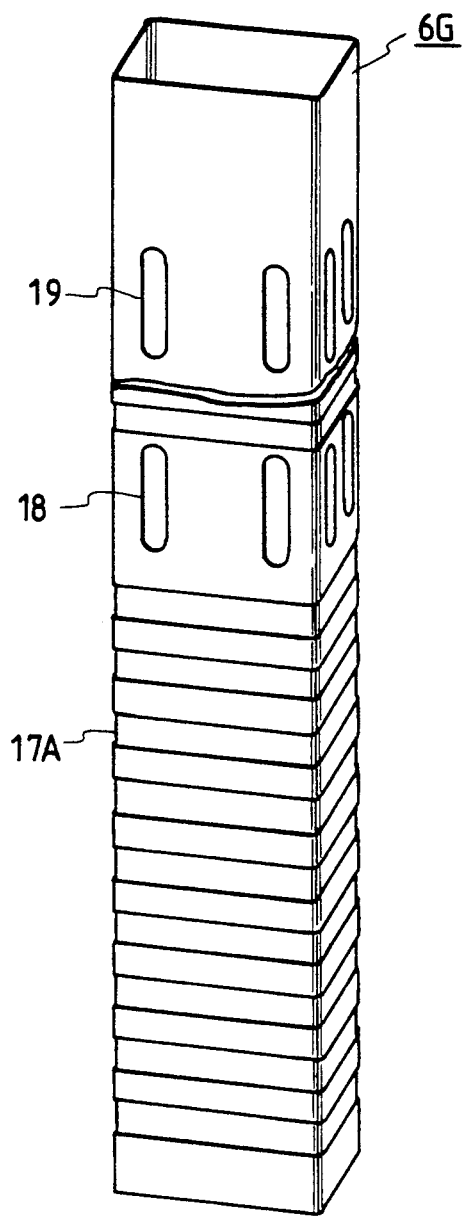

FUEL ASSEMBLY, CHANNEL BOX, PRODUCTION METHOD OF CHANNEL BOX, AND CORE OF NUCLEAR REACTOR

BACKGROUND OF THE INVENTION

1. Field of the Invention

This invention relates to fuel assembly, channel box, production method of the channel box and core of nuclear reactor. More particularly, the present invention relates to fuel assembly, channel box, production method of the channel box and core of nuclear reactor which will be suitable for a boiling water reactor.

2. Description of the Prior Art

Each fuel assembly used in a boiling water reactor is equipped with upper and lower tie plates, a plurality of fuel rods whose both end portions are supported by these tie plates, fuel spacers for bundling these fuel rods and a channel box encompassing the bundle of fuel rods and fitted to the upper tie plate. The fuel assembly is loaded into the core of the nuclear reactor. A pressure loss is different inside and outside the fuel assembly during the reactor operation and a pressure difference occurs between the inner and outer surfaces of the channel box. This pressure difference is greater at the lower end portion of the fuel assembly and the pressure acting on the inner surface of the channel box is greater than the pressure acting on its outer surface. Therefore, the channel box expands outward and undergoes large creep deformation with the passage of the operation time of the nuclear reactor. This creep deformation will possibly result in the increase in a flow rate of leaking cooling water from between the channel box and the lower tie plate and in the trouble of a control rod operation.

One of the methods to cope with creep deformation of the channel box disposes recesses (or projections) on the sidewalls of the channel box as described in Japanese Patent Laid-Open Nos. 58487/1975 and 13894/1979 and in U.S. Pat. No. 3,715,274.

Japanese Patent Laid-Open No. 58487/1975 discloses a channel box equipped on its sidewalls with projections that project inward and thinly in a horizontal direction. Rigidity of this channel box is improved in a direction orthogonal to an axis. U.S. Pat. No. 3,715,274 teaches to dispose corrugated portions having concavo-convexities that repeat in an axial direction, on the sidewall portions of the channel box opposing the lower tie plate. Japanese Patent Laid-Open No. 13894/1979 shows in its FIGS. 3 and 4 a channel box equipped with projections which project inward and are disposed above, and in the proximity of, the upper surface of the lower tie plate and at a position of ⅓ of the full length of a fuel rod from the lower end of the fuel rod. The number of these projections is the same as that of a large number of tabs disposed on a band of a fuel spacer, and they are disposed at the same level and have a width capable of passing through the tabs. These tabs come into contact with the inner surface of the channel box and support the fuel spacer in a horizontal direction. FIGS. 7 and 8 of Japanese Patent Laid-Open No. 13894/1979 show the structure wherein a large number of projections described above are disposed on the sidewall portions of the channel box facing the lower tie plate. The lower tie plate is equipped on its outer side surface with a large number of grooves into which the projections described above are fitted.

In accordance with Japanese Patent Laid-Open No. 58487/1975 and U.S. Pat. No. 3,715,274, the height of the projections from the inner surface of the channel box in a direction vertical to an axis is limited to a range such that the projections can pass through the gap between the inner surface of the channel box and the support tabs disposed on the fuel spacer. When outwardly projecting projections are dispose on the channel box, too, the height of the projections cannot be much increased in order to avoid interference with a control rod.

As higher burnup of a fuel assembly and reutilization of a channerl box have been attempted recently, the residence time of the channel box inside a core tends to remarkably increase. Therefore, the increase in strength for inhibiting creep deformation of the channel box has been all the more desired than in the prior art. The channel box disclosed in Japanese Patent Laid-Open No. 58487/1975 and U.S. Pat. No. 3,715,274 cannot satisfy this requirement because the height of the projections cannot be increased much more than the height described above.

The projection disclosed in Japanese Patent Laid-Open No. 13894/1979 has a width such that the projection can pass through the gap between the tabs disposed on the fuel spacer. Accordingly, the height of this projection can be made greater than that of the two prior art references described above. However, the width of each projection positioned at the same level is limited by the gap between the tabs in the horizontal direction. Therefore, the degree of the increase in strength by the projection in Japanese Patent Laid-Open No. 13894/1979 is not much great and fails to satisfy the requirement described above. Furthermore, in accordance with the structure disclosed in Japanese Patent Laid-Open No. 13894/1979, each of the projections disposed on the channel box must be passed through the gap between the tabs disposed on each of a plurality of fuel spacers disposed in an axial direction when the channel box is fitted to a fuel bundle. Therefore, fitting of the channel box is troublesome and time-consuming.

SUMMARY OF THE INVENTION

It is a first object of the present invention to provide a fuel assembly, a channel box and a core of a nuclear reactor capable of reducing further creep deformation of a channel box.

The object described above can be accomplished by a channel box which has spacer support means projecting inward and supporting a fuel spacer in a direction vertical to an axis.

Since the channel box is equipped with the spacer support means, the height of creep deformation inhibition portions (the height in the direction vertical to the axis) formed on the channel box can be increased and moreover, the width of the creep deformation inhibition portions in the transverse direction of the sidewalls of the channel box can be increased without being limited by the spacer support means. Accordingly, strength of the channel box can be increased remarkably and creep deformation of the channel box can be drastically reduced.

BRIEF DESCRIPTION OF THE DRAWINGS

FIGS. 8a–e is an explanatory view useful for explaining the state of a cylinder member which varies with the production steps shown in FIG. 7;

FIGS. 17, 18 and 26 are longitudinal sectional views each showing other embodiment of a spacer support tab;

FIGS. 19, 20 and 27 are longitudinal sectional views each showing the fuel assembly in accordance with still another embodiment of the present invention;

FIGS. 21 to 25 are perspective views each showing other embodiment of the channel box shown in FIG. 1;

DETAILED DESCRIPTION OF THE PREFERRED EMBODIMENTS

Figure 1:
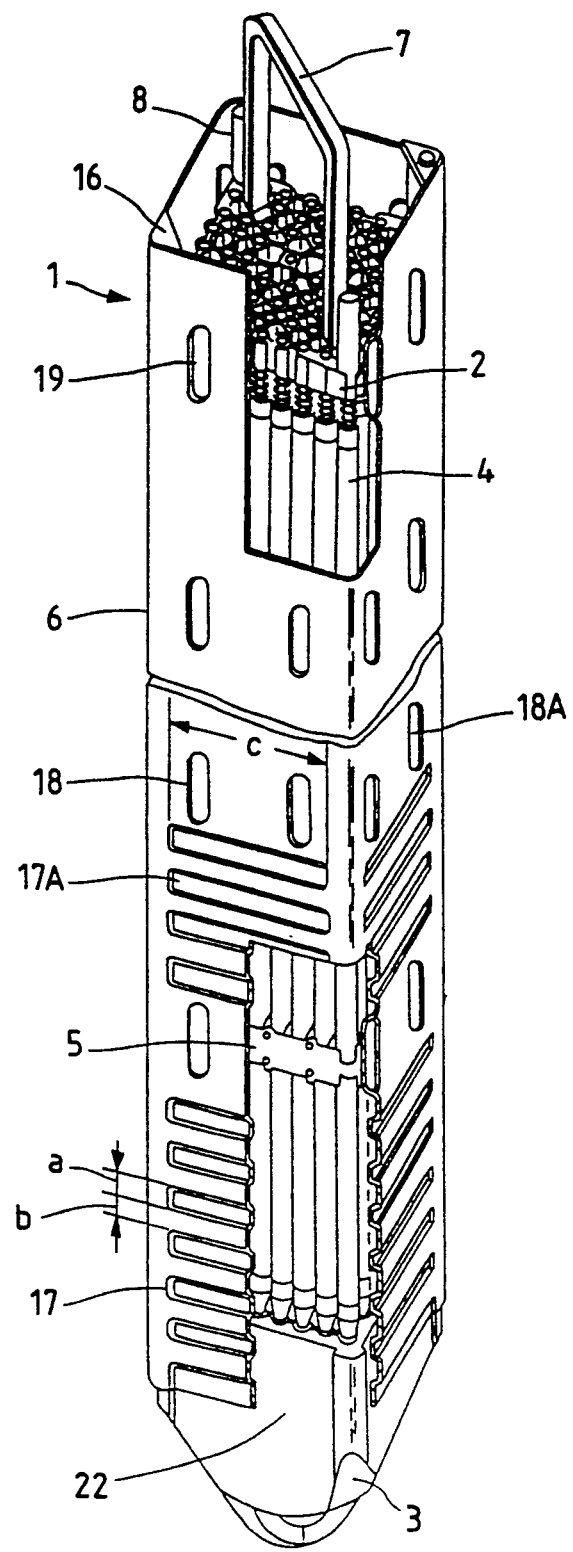
FIG. 1 is a perspective view of a fuel assembly in accordance with a preferred embodiment of the present invention.

A fuel assembly in accordance with an embodiment of the present invention applied to a boiling water reactor will be explained with reference to FIGS. 1 and 2.

The fuel assembly 1 of this embodiment includes an upper tie plate 2, a lower tie plate 3, a large number of fuel rods 4 whose both ends are supported by the upper and lower tie plates 2, 3 and fuel spacers 5 for keeping the mutual gaps between the fuel rods 4. The fuel rods 4 are disposed in grid with a predetermined pitch. A channel box 6 which is fitted to the upper tie plate 2 encompasses the bundle of fuel rods and extends downward. The lower end portion of the channel box 6 extends below the upper surface of the lower tie plate 3 and encompasses this lower tie plate 3.

Figure 3:
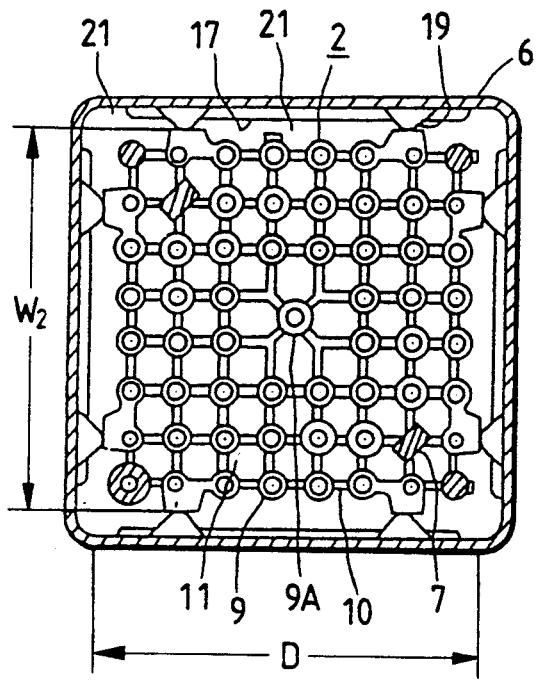
FIG. 3 is a sectional view taken along line III—III of FIG. 2.

The upper tie plate 2 is equipped on its upper surface with a handle 7 and with four posts 8. Furthermore, the upper tie plate 2 has a large number of bosses 9 disposed in grid as shown in FIG. 3. Adjacent bosses 9 are coupled with one another by ribs 10. Those spaces 11 which are encompassed by a plurality of bosses 9 and a plurality of ribs 10 define coolant passages and penetrate through the upper tie plate 2. An upper end plug of each fuel rod 4 is inserted into the hole portion bored in each boss 9. A boss 9A at the center of the upper tie plate 2 supports the upper end plug of a water rod 12.

Figure 2:
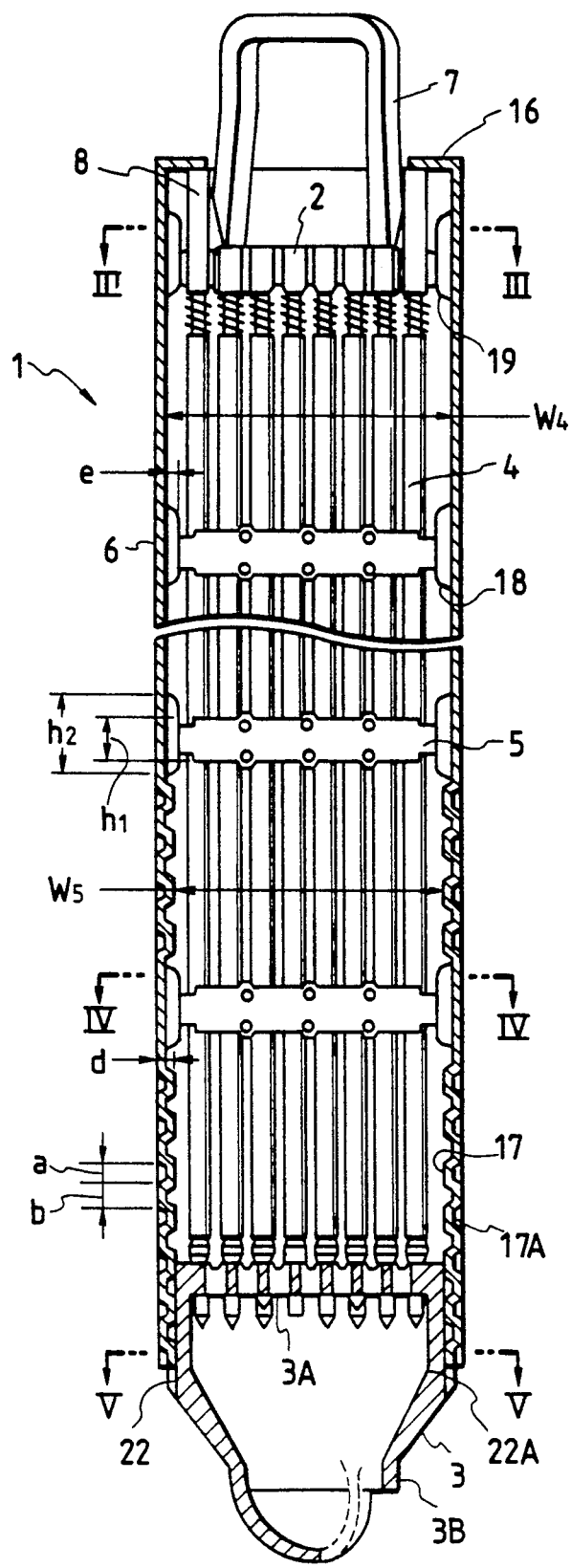
FIG. 2 is a longitudinal sectional view of the fuel assembly shown in FIG. 1.

Each fuel spacer 5 has a plurality of cylinder members 13, a plurality of loop-like springs 14 and a band 15 for encompassing the outer portion of each cylinder member 13 at the outermost periphery as shown in FIGS. 2A and 2B of U.S. Pat. No. 4,508,679 and in FIG. 2 of U.S. Pat. No. 4,686,079. Each fuel rod 4 is inserted into each cylinder member 13. Seven fuel spacers 5 are disposed with predetermined gaps between them in the axial direction of the fuel assembly 1. The water rod 12 is disposed at the center of the cross-section of the fuel assembly 1. As depicted in FIG. 3 of U.S. Pat. No. 4,686,079, the water rod 12 is supported by the fuel spacers 5 in the horizontal direction and supports the fuel spacers 5 in the axial direction, on the contrary. The outer diameter of the water rod 12 occupies the area in which four fuel rods 4 can be disposed.

The channel box 6 is a cylindrical member whose cross-section is square. A clip 16 which is placed on the upper surface of the post 8 is disposed at each corner of the channel box 6. Two kinds of tabs are disposed on the four side surfaces of the channel box 6, respectively. These tabs are defined by projecting part of the side walls of the channel box 6. Accordingly, recesses 17A, 18A are defined on the outer surfaces of the channel box 6. The tabs of one of the kinds are reinforcing tabs 17 and the other kind of tabs are support tabs such as tabs 18 for supporting the spacers and tabs 19 for supporting the upper tie plate. Each reinforcing tab 17 is a projecting portion that extends thinly in a transverse direction, and its width c is considerably greater than its height a in the axial direction. The reinforcing tabs 17 are disposed at positions between the position of the second fuel spacer 5 from the bottom (the second fuel spacer) and the lower end of the channel box 6. The second fuel spacer 5 is placed at a position which is ¼ of the full length distant from the lower end of the channel box 6. These reinforcing tabs 17 function as creep deformation inhibition means of the channel box 6.

A corrugated portion which repeats concavoconvexities in the axial direction of the channel box 6 is defined by a plurality of reinforcing tabs 17. The corrugated portion which exhibits resistance to creep deformation is a creep deformation inhibition portion. The fuel spacers 5 are referred to as the "first fuel spacer", "second fuel spacer", . . . , "seventh fuel spacer" from below in order named. The support tabs 18 and 19 are projecting portions that extend thinly in the axial direction of the fuel assembly 1. The thinly extending direction of these tabs 18 and 19 crosses the direction of the reinforcing tabs 17. Each support tab 18 is disposed in such a manner as to correspond to the level of each fuel spacer 5. Two support tabs 18 are disposed for each fuel spacer 5 on each side surface of the channel box 6.

Figure 4:
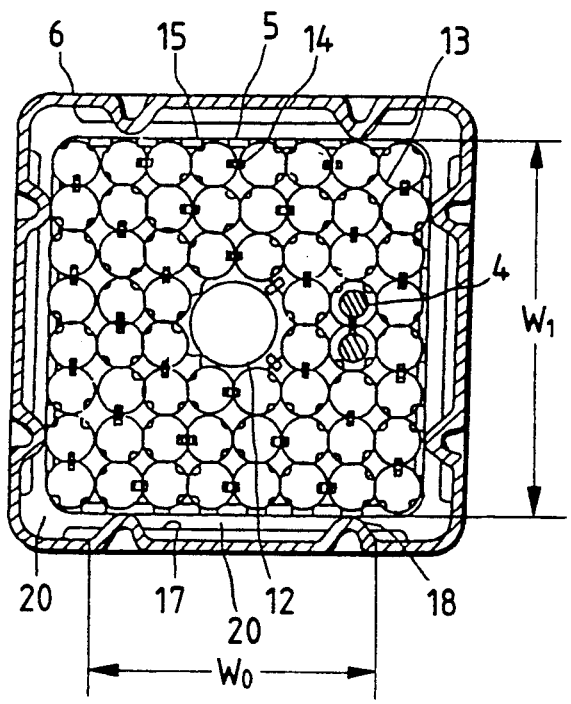
FIG. 4 is a sectional view taken along line IV—IV of FIG. 2.

As shown in FIGS. 2 and 4, each support tab 18 comes into contact with the band 15 of the fuel spacer 5 and supports the fuel spacer 5 in the horizontal direction. The support tab 19 comes into contact with the outer side surface of the upper tie plate 2 and supports the upper tie plate 2 in the horizontal direction. These support tabs 18 and 19 are disposed at the positions where they face the second fuel rods 4 from the fuel rods 4 positioned at the corners among the fuel rods disposed at the outermost periphery. Unlike the prior art technology, those tabs which come into contact with the inner surface of the channel box are not formed on the band 15 of the fuel spacer 5. Accordingly, the band 15 can be shaped by merely bending a flat sheet and the production becomes easier.

The height $h_2$ (see FIG. 2) of the support tab 18 is greater than the height $h_1$ of the fuel spacer 5 so that the support tabs 18 can support the fuel spacers 5 even when the fuel rods 4 extend in the axial direction upon thermal expansion during the operation of the unclear reactor and a difference of the moving distance occurs between the fuel spacers 5 and the channel box 6. The coolant passages 20 are defined between the inner surface of the channel box 6 and the outer surface of the bands 15 of the fuel spacers 5 except for the portions of the support tabs 18. The coolant passages 21 are defined between the inner surface of the channel box 6 and the outer side surface of the upper tie plate 2 except for the portions of the support tabs 19, as well. Incidentally, the height e of the support tabs 18 and 19 from the inner surface of the channel box 6 must be greater than height d of the reinforcing tabs 17 so that the channel box 6 can be fitted to the fuel bundle. The term "fuel bundle" used hereby means the remaining portions of the fuel assembly 1 other than the channel box 6. The support tabs 18 for supporting the first fuel spacer 5 are positioned between the reinforcing tabs 17 in the axial direction. The gap b between the adjacent reinforcing tabs 17 is equal to the height a of the reinforcing tabs 17 in the axial direction.

Hole portions into which lower end plugs of the fuel rods 4 and water rod 12 fitted are bored in the lower tie plate 3 in the same way as in the upper tie plate 2. These hole portions exist at the fuel holding portion 3A of the lower tie plate 3. The insertion portion 3B which is disposed at the lower part of the lower tie plate 3 is inserted into a fuel support fixture (not shown in the drawing) inside the core. The center 0 of the insertion portion 3B exists on the axis of the fuel assembly 1. The lower tie plate 3 is equipped with a groove 22 extending from its upper surface to its lower surface on each sidewall of its four side surfaces. A recess which extends downward from the upper surface of the tie plate 3 and is closed at the lower end may be disposed on each outer sidewall in place of the groove 22 described above.

The reinforcing tabs 17 disposed at the lower end of the channel box 6 are fitted into the grooves 22. Therefore, the reinforcing tabs 17 are disposed near to the lower end of the channel box 6. Moreover, the width of the water gaps defined between the fuel assemblies loaded into the core are not reduced by the reinforcing tabs 17. In other words, loadability of the control rods between the fuel assemblies is not impeded by these reinforcing tabs 17.

The width $W_1$ between the outer surfaces of the opposed sidewalls of the band 15 of the fuel spacer 5 (FIG. 4) and the width $W_2$ between the portion of the outer side surfaces of the upper tie plate 2 that come into contact with the tabs 19 must be smaller than the width $W_3$ between the bottom surfaces 22A of the mutually opposed grooves 22 of the lower tie plate 3. In this embodiment, these widths $W_1$ and $W_2$ are smaller than the width $W_3$.

Figure 6:
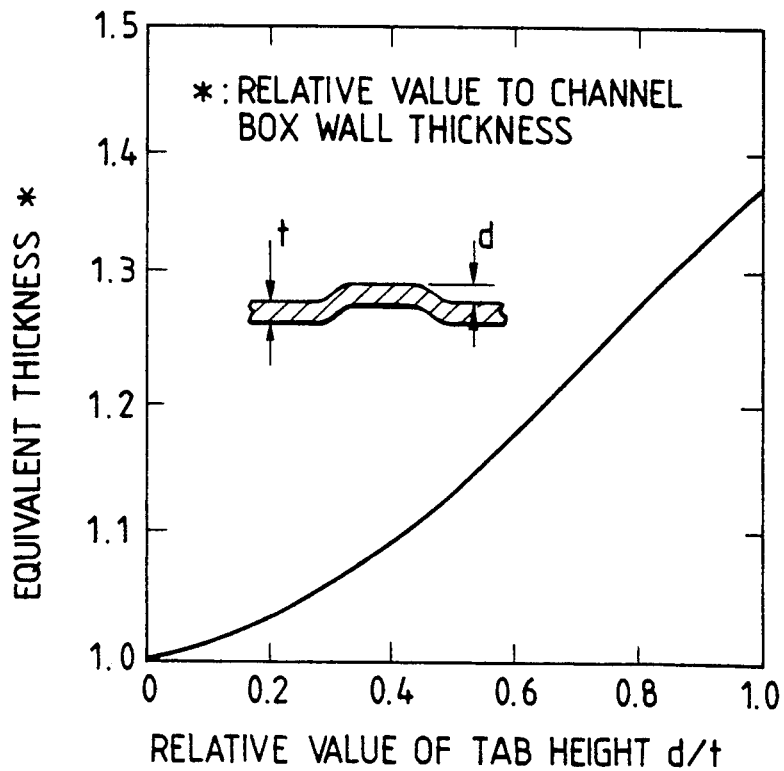
FIG. 6 is a diagram showing the relation between the height of a tab and an equivalent thickness.

In this embodiment the support portions of the fuel spacers 5 in the horizontal direction are formed in the channel box 6 and for this reason, the height d (FIG. 2) of the reinforcing tubs 17 can be made higher. Accordingly, creep deformation of the channel box can be reduced remarkably. Incidentally, the height d of the reinforcing tabs 17 can be increased maximum to the height e of the support tabs 18. FIG. 6 shows the relation between the ratio of the height d of the reinforcing tabs 17 to the thickness t of the channel box 6 (d/t) and a equivalent thickness. If the height d is 0.8 t, for example, it is possible to obtain the strength equivalent to the state where the thickness of the channel box 6 is about 1.3 t. FIG. 6 shows the characteristics when a=b and the effect of increasing the strength by the reinforcing tabs 17 attains the maximum when a=b. Since the reinforcing tabs 17 are formed between the lower end of the channel box 6 and the position equal to ¼ of the full length of the channel box 6, creep deformation of the lower part of the channel box 6 can be inhibited drastically.

Particularly because the reinforcing tabs 17 are formed at the portion of the channel box 6 opposing the outer side surface of the lower tie plate 3, too, creep deformation in the proximity of the lower tie plate 3 can be inhibited remarkably. Furthermore, the width c of the reinforcing tubs 17 is set preferably to be at least 80% of the width D (FIG. 3) of the portions of the sidewall on one outer surface of the channel box 6 in the horizontal direction other than the curved portion at the corner of the sidewall. Particularly in this embodiment, the width c of the reinforcing tabs 17 can be made greater than the gap $W_0$ between the adjacent support tabs 18 in the horizontal direction (FIG. 4) without being limited by this gap $W_0$. The increase in the height d and width c described above improves remarkably the strength of the channel box 6; hence, creep deformation of the channel box can be inhibited remarkably. Accordingly, the residence time of the channel box 6 inside the core can be extended remarkably and the channel box 6 can cope with high burnup of the fuel assembly, and the like.

Since the height d is below the height e in this embodiment, the reinforcing tabs 17 are not caught by the fuel spacers 5 and by the upper tie plate 2 at the time of mounting of the channel box 6. For, the channel box 6 is fitted to the fuel bundle from the side of the upper tie plate 2. Particularly, the present embodiment does not need to pass the reinforcing tabs 17 between a plurality of tabs dispose in the fuel spacers at the time of fitting of the channel box as has been necessary in the prior art technology of Japanese Patent Laid-Open No. 13894/1979. Accordingly, the channel box 6 can be fitted to the fuel bundle within a short period of time and its fitting is easy.

In this embodiment, creep deformation at the lower part of the channel box 6 can be reduced remarkably. Therefore, the margin of the water gap width between the fuel assemblies 1 with respect to the insertion property of the control rods becomes greater. Part of this creep deformation inhibition effect is helpful to reduce the thickness of the channel box 6 directed to reduce the neutron absorption quantity under the state where an excellent insertion property of the control rods is maintained. This reduction of thickness improves the neutron utilization ratio of the fuel assembly. The decrease in the creep deformation inhibition effect due to the reduction of thickness does not become the problem to the insertion property of the control rods and the problem to the application of the channel box 6 to the fuel assembly having high burnup (at least 38 GWd/t) because the reinforcing tabs 17 and the support tabs 18 are disposed. Creep deformation at the time of high burnup is small. The channel box having a reduced thickness can be applied particularly to the fuel assembly of at least 50 GWd/t, too.

The increase in the pressure loss can be checked because the support tabs 18 support the fuel spacers 5. For, the coolant passages 20 are defined. When the reinforcing tabs 17 support the fuel spacers 5, the area of the flow path of the coolant passage 20 at the level of the fuel spacers 5 becomes remarkably small and the pressure loss increases drastically. Support of the upper tie plate 2 by the support tabs 19 prevents the increase of the pressure loss and improves rigidity of the fuel assembly.

The width between the inner surfaces of the opposed sidewalls of the channel box 6 is substantially the width $W_5$ (FIG. 2) between the inner surfaces of the opposed reinforcing tabs 17, at the portions below the second fuel spacer 5. Above this second fuel spacer 5, on the other hand, the width between the inner surfaces of the opposed sidewalls of the channel box 6 is substantially the width $W_4$. Since $W_4 > W_5'$ the pressure loss is high at the lower part of the fuel assembly 1 and is small at its upper part. Therefore, channel stability of the fuel assembly 1 can be improved.

Figure 9:
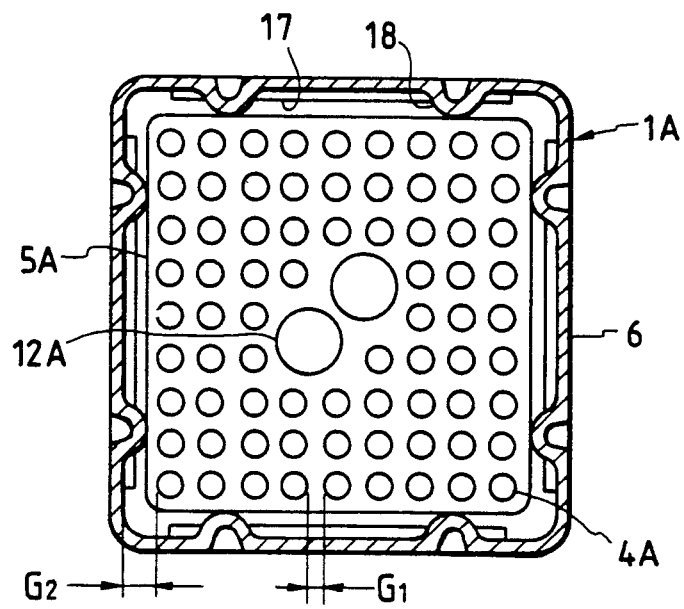
FIG. 9 is a transverse sectional view of a fuel assembly in accordance with another embodiment of the present invention.

This embodiment can increase the strength of the lower pate of the channel box (since the height d is great) and can improve the critical power in the same way as in the fuel assembly 1A shown in FIG. 9 due to the increase in the height e. The characteristics of later-appearing FIG. 10 remains substantially unchanged in this embodiment, too. The characteristics of $G_2/G_1 \approx 1.0$ are for the conventional fuel assembly equipped with the channel box whose sidewalls are straight.

The present boiling water reactors can be classified broadly into a reactor into which fuel assemblies each having a channel box having the width $W_4$ of 132.46 mm between the inner surfaces of the opposed sidewalls are loaded and a reactor into which fuel assemblies each having a channel box having the diameter $W_4$ of 134.06 mm are loaded. The fuel rod pitches are different between these reactors. The pitch of the latter is greater than that of the former. These channel boxes have those sidewalls which do not have each of the tabs described already but are straight in the axial direction. The application of this embodiment to these fuel assemblies having different shapes provides the fuel bundle having a shape that can be used in common for both of them. Accordingly, only one kind of fuel bundle may be prepared for a plurality of kinds of cores and the production of the fuel bundles can be simplified.

Figure 17:
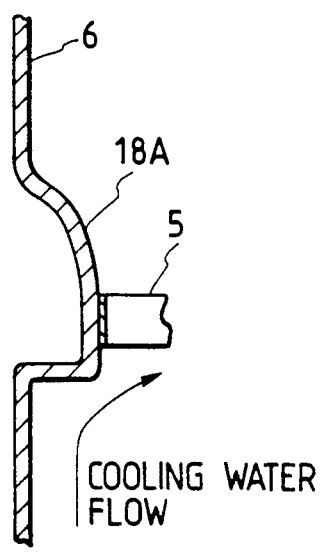
Figure 18:
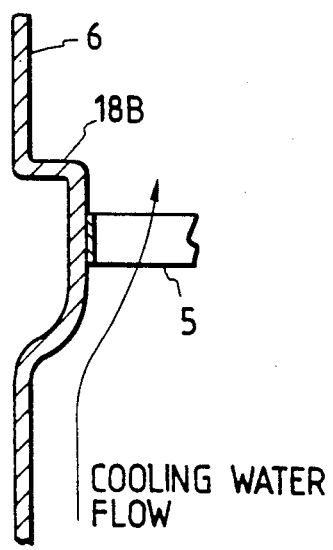

The support tabs 18 splash cooling water that rises along the inner surface of the channel box 6 toward the fuel rods 4. Due to this function of the support tabs 18, cooling water (liquid) on the inner surface of the channel box 6 that does not originally contribute to cooling of the fuel rods is helpful to cool the fuel rods 4 at the upper part of the fuel assembly 1 where gas-liquid two flows exist. As a result, the cooling effect of the fuel rods near the corners can be improved. The support tabs 18 are preferably positioned between the fuel rods at the corners and the fuel rods 4 adjacent to the former. The critical power of the several fuel rods 4 positioned at the corners can be further improved. The shape of the support tabs 18 may be the same as that of the spacer support tabs 18A and 18B such as shown in FIGS. 17 and 18.

Figure 5:
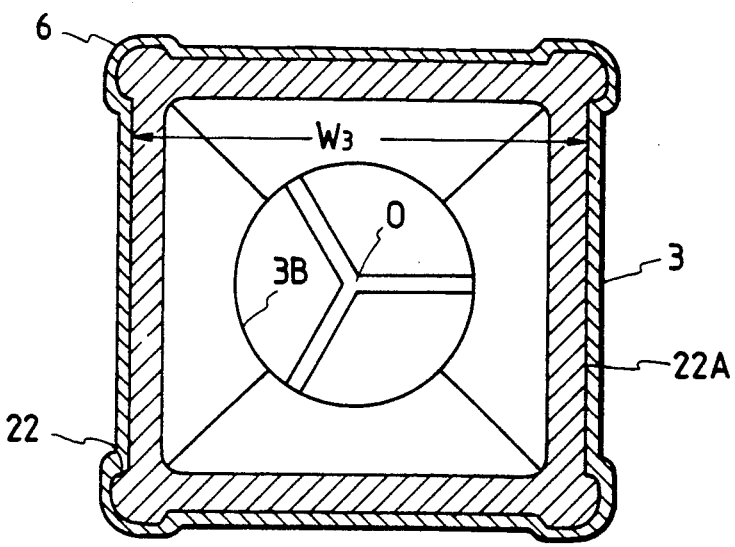
FIG. 5 is a sectional view taken along line V—V of FIG. 2.
Figure 7:
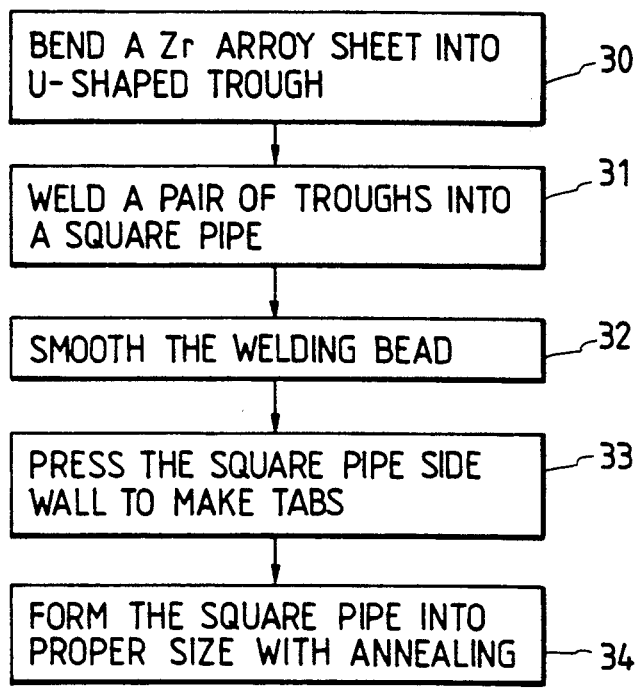
FIG. 7 is a flowchart useful for explaining the production steps of the channel box shown in FIG. 1.

A production method of the channel box 6 used for the fuel assembly 1 of this embodiment will be explained with reference to FIG. 7. After a sheet of a zirconium alloy (such as zircaloy-4) is cut in a predetermined shape, the sheet is bent in a U-shape by press machining (step 30). FIG. 8(a) shows the sheet bent in the U-shape. Next, two U-shaped zirconium alloy members are butt-welded on their side surfaces as shown in FIG. 8(b) to produce a cylinder member 35 (step 31). Reference numeral 48 represents a weld portion. The weld bead is flattened by roller machining (step 32) to obtain a cylinder member 35A shown in FIG. 8(c). The tabs 17, 18 and 19 are defined on the sidewalls of the cylinder member 35A by press machining (step 33). As a result, a cylinder member 35B shown in FIG. 8(d) is obtained. Press machining of the step 33 is carried out as shown in FIG. 8(e). A die 36 having a plurality of recesses 37 formed on its surface so as to correspond to the tabs 17-19 is inserted into the cylinder member 35A while penetrating through the cylinder member 35A in its axial direction. The cylinder member 35A is placed on the bed (not shown) of the press. Both end portions of the die 36 are supported by two arms that are fitted to the driving unit of the press outside the cylinder member 35A. One of the arms comes off from the die 36 when the die 36 is inserted into the cylinder member 35A (or when it is removed from the latter, on the contrary). Another die 38 having a plurality of projections 39 is positioned outside the cylinder member 35A. This die 38 is fitted to a rod of the press that moves up and down, though it is not shown in the drawing. Each projection 39 is fitted into the corresponding recess 37 of the die 36 when the die 38 lowers. Accordingly, the tabs 17, 18 and 19 are formed on one sidewall of the cylinder member 35A. Similarly, the tabs are formed on the other sidewalls. Since the formation of each tab is made after the formation of the cylinder member, the tabs can be formed easily even on the sidewall on which the weld portion 48 exists. The flattening work of the weld bead can be made easily, as well. After the step 33 is completed, expanded pipe formation and annealing are carried out for the cylinder member 35B (step 34). Expanded pipe formation and annealing are carried out simultaneously. Their definite method is described in Japanese Patent Laid-Open No. 131354/1982, page 2, lower left column, line 17 to page 33, lower right column, line 9 and in FIGS. 5 and 6. The step 34 is carried out particularly preferably in accordance with the method described on page 3, upper right column, line 16 to lower right column, line 9 and in FIG. 6 of this reference.

When the method of the reference described above is employed, it is necessary to form a recess for inserting the tabs 17 or the like on the outer surface of "tyuseishi Jigu" shown in FIG. 6. Since expanded pipe formation and annealing are carried out after the tab formation, strain that occurs at the time of the tab formation can be eliminated and a channel box 6 having high dimensional accuracy can be obtained. The step 33 may be carried out after the step 34 in order to improve dimensional accuracy of each tab. However, dimensional accuracy drops at the time of the expanded pipe formation and strain remains due to the press work and for this reason, machining of the step 34 must be conducted once again.

The channel box 6 produced in the manner described above is fitted to the upper tie plate 2 of the fuel bundle, and there is thus obtained the fuel assembly 1.

The channel box 6 has two support tabs 18 disposed at the same level on each sidewall but three or more support tabs 18 may be disposed, as well. If the number of support tabs 18 at the same level on one sidewall is greater, the surface pressure per tab can be reduced more greatly and deformation of the fuel spacer 5 can be restricted more effectively. If the number of support tabs 18 is too great, however, the pressure loss of the fuel assembly becomes great. Accordingly, the number of the support tabs 18 at the same level on one sidewall is preferably 2 or 3.

FIG. 9 shows the fuel assembly 1A in accordance with another embodiment of the present invention which is obtained by applying the channel box 6 to the fuel assembly described in Japanese Patent Laid-Open No. 311195/1988, page 5, lower right column, line 14 to page 7, lower right column, line 11 and in FIGS. 1-5. The fuel assembly 1A comprises the fuel rods 4A that are arranged in 9 rows by 9 columns. Two water rods 12A having an outer diameter which is greater than the pitch of the fuel rods are disposed at the center of the cross-section of the fuel assembly 1A. The rest of the construction other than the structure described above are the same as those of the fuel assembly 1. The two water rods 12A occupy the area in which seven fuel rods 4A can be disposed. The fuel spacer 5A is substantially the same as the fuel spacer shown in FIGS. 4 and 5 of Japanese Patent Laid-Open No. 311195/1988. The support tabs 18 support the fuel spacers 5A in the horizontal direction.

Figure 10:
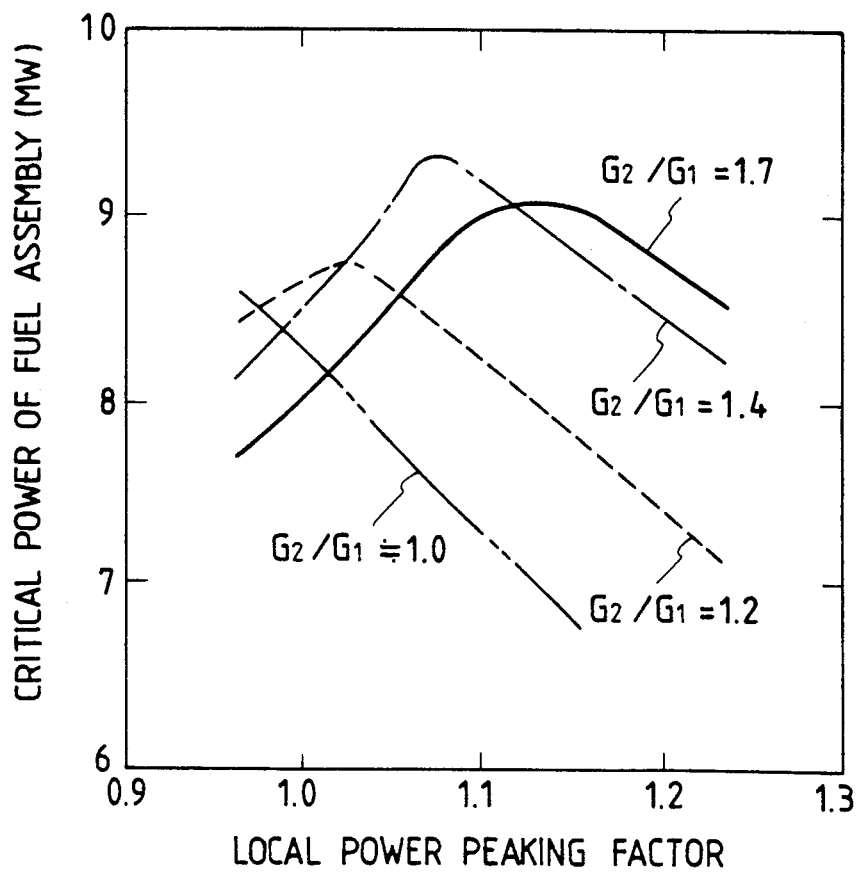
FIG. 10 is a diagram showing the relation between local power peaking and a critical power.

This fuel assembly 1A provides the same effect as that of the fuel assembly 1. FIG. 10 shows quantitatively the increase in the critical power obtained in this embodiment. Symbol $G_1$ represents the gap width between the adjacent fuel rods 4A as shown in FIG. 9 and $G_2$ is the gap width between the inner surface of the channel box 6 and the fuel rods 4A that are adjacent to this inner surface with the shortest distance. The conventional fuel assembly equipped with the channel box whose sidewalls are straight, shown in FIG. 3 of Japanese Patent Laid-Open No. 311195/1988, has the characteristics of $G_2/G_1 \approx 1.0$. The height d of the reinforcing tabs 17 can be increased by increasing the height e of the support tabs 18 and the strength at the lower part of the channel box 6 can be further increased. At the same time, since the gap width $G_2$ is great and the gap width $G_1$ becomes small, the critical power increases much more than when $G_2/G_1 \approx 1.0$. (Refer to the characteristics when $G_2/G_1 \approx 1.2, 1.4$ and $1.7$, respectively.) This embodiment can improve the critical power by 10% in comparison with the prior art technology and can increase also the operation margin of the reactor. The local power peaking factor of the fuel assembly is greater than 1.0 and during the period of use of the fuel assembly, the local power peaking factor is generally within the range of from about 1.1 to about 1.25.

Figure 11:
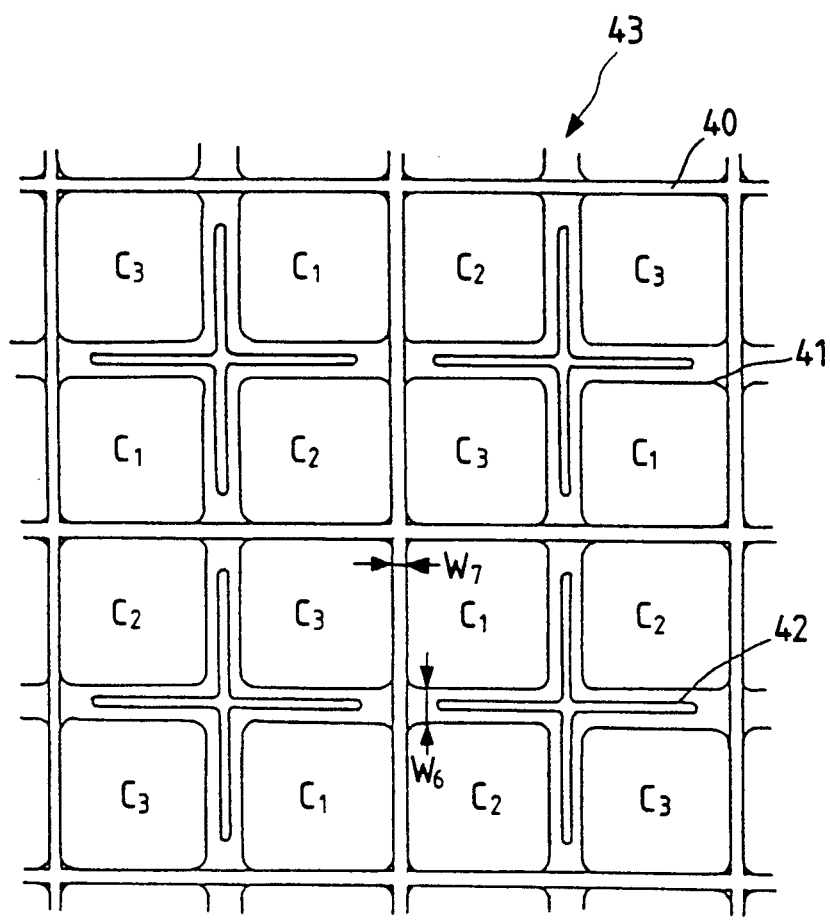
FIG. 11 is a plan view of an example of a prior art core.
Figure 12:
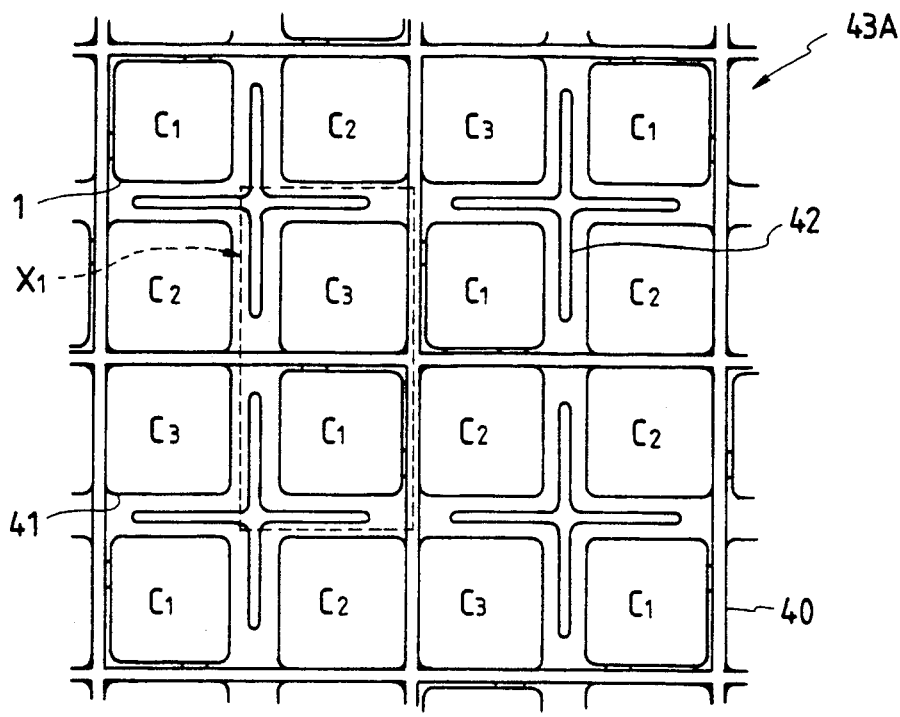
FIGS. 12, 14 and 16 are plan views each showing the core to which the fuel assembly of the invention shown in FIG. 1 is applied.
Figure 13:
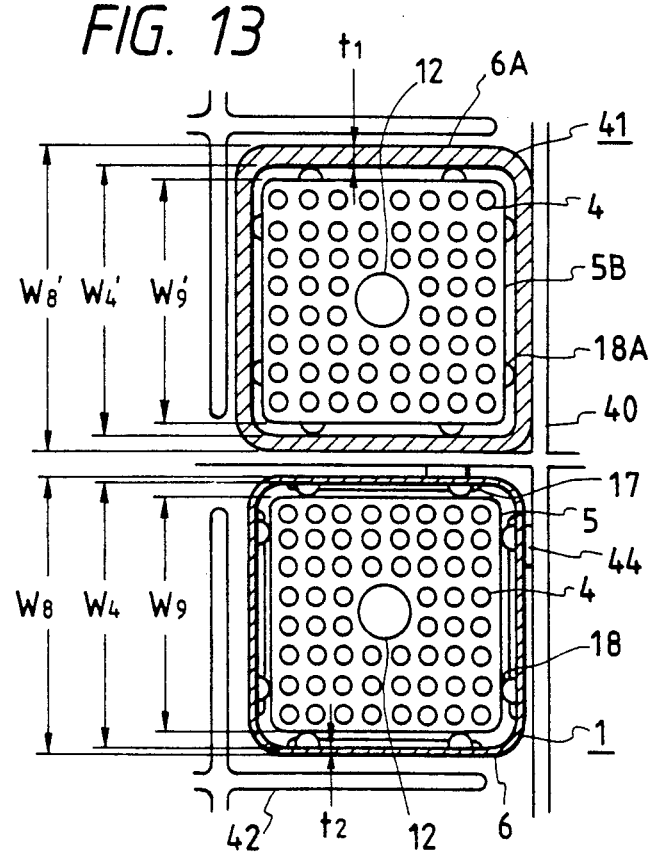
FIG. 13 is an enlarged view of an $x_1$ portion shown in FIG. 12.

An embodiment of the core of a boiling water reactor when the fuel assembly shown in FIG. 1 is applied thereto will be explained with reference to FIGS. 11 to 13. FIG. 11 shows the conventional core 43 into which the conventional fuel assemblies 41 equipped with the channel box having the straight sidewalls are loaded and this is part of the core shown in FIG. 2 of Japanese Patent Publication No. 37911/1988. One cell includes four fuel assemblies 41 that are adjacent to the control rods 42 and encompass the control rods 42. The upper end portion of each fuel assembly 41 is rushed to the upper core grid plate 40 by a channel fastener (not shown). In the fuel assembly 41, the width $W_4'$ (FIG. 13) between the inner surfaces of the opposed sidewalls of the channel box is 134.06 mm. In the core 43, the gap width $W_6$ of the water gap into which the control rods 41 are inserted is equal to the water gap $W_7$ below the upper core grid plate 40 into which the control rods 42 are not inserted. In FIG. 11, symbol $C_1$ represents the fuel assembly 41 which is subjected to the operation of the first fuel cycle; $C_2$ is the fuel assembly 41 subjected to the operation of the second fuel cycle; and $C_3$ is the fuel assembly 41 subjected to the operation of the third fuel cycle. A fuel assembly $C_1$ is a novel fuel assembly (burnup 0 GWd/t) at the start of the operation of a certain fuel cycle. When the operation of one fuel cycle is completed, the fuel assembly $C_3$ is taken out from the core as the used fuel assembly and the fuel assembly 1 having burnup of 0 GWd/t is loaded instead. Such a fuel exchange constitutes the core 43A (FIG. 12) of the core of this embodiment which is subjected to the operation of the next fuel cycle. In the core 43A, the fuel assemblies $C_2$ and $C_3$ are the fuel assembly 41 and the fuel assembly $C_1$ is the fuel assembly 1. FIG. 13 shows in enlargement the $X_1$ portion of FIG. 12. The fuel assembly 41 is equipped with the channel box 6A whose sidewalls are straight. The fuel spacer 5B is the fuel spacer 5 equipped with the tabs 18A on its band. The tabs 18A come into contact with the inner surface of the channel box 6A and support the fuel spacr 5B in the horizontal direction. Since the channel box 6 is equipped with the support tabs 18 and the reinforcing tubs 17, the strength of the lower part of the channel box 6 is higher than of the channel box 6A and the neutron absorption quantity of the channel box 6 is smaller than that of the channnel 6A. The thickness $t_2$ of the channel box 6 is smaller than the thickness $t_1$ of the channel box 6A. For example, $t_1$ is 2.54 mm and $t_2$ is 2.00 mm.

The fuel assembly 1 will be compared with the fuel assembly 41. The width $W_4$ between the inner surfaces of the opposed sidewalls of the channel box 6 is equal to the width $W_4'$ of the channel box 6A and is 134.06 mm. If the width $W_4$ and the width $W_4'$ are different within the range of tolerance (e.g. $\pm 0.25$ mm), the width $W_4$ and $W_4'$ are substantially equal to each other. the width $W_8$ between the outer surfaces of the opposed sidewalls of the channel box 6 is smaller than the width $W_8'$ of the channel box 6A because the thickness $t_2$ is smaller. Accordingly, the channel spacer 44 that comes into contact with the core upper grid plate 40 is disposed at the portion of the channel box 6 facing the core upper grid plate 40. The width $W_9$ between the outer surfaces of the opposed sidewalls of the band 15 of the fuel spacer 5 is smaller than the corresponding width $W_9'$ of the band of the fuel spacer 5B. The thickness of the band 15 of each fuel spacer is equal.

As to the fuel assembly 1 loaded into the core 43A, the area of the coolant passage inside the channel box 6 is substantially equal to that inside the channel box 6A of the fuel assembly 41. Since the width $W_9$ is smaller than the width $W_9'$, $G_2/G_1$ of the fuel assembly 1 is greater than that of the fuel assembly 41 whose $G_1/G_2$ value is about 1.0. Accordingly, the critical power of the fuel assembly 1 is greater than that of the fuel assembly 41. This embodiment utilizes the decrement of the thickness obtained by reducing the thickness of the channel box 6 for increasing the water gap width $W_6$ and $W_7$. Accordingly, the moderation effect of the neutron can be improved around the fuel assembly 1 and reactivity increases. When the operation of one fuel cycle is completed in the core 43A, the fuel assembly $C_3$ of the core 43A is withdrawn as the used fuel and the new fuel assembly of burnup of 0 GWd/t is loaded.

Figure 14:
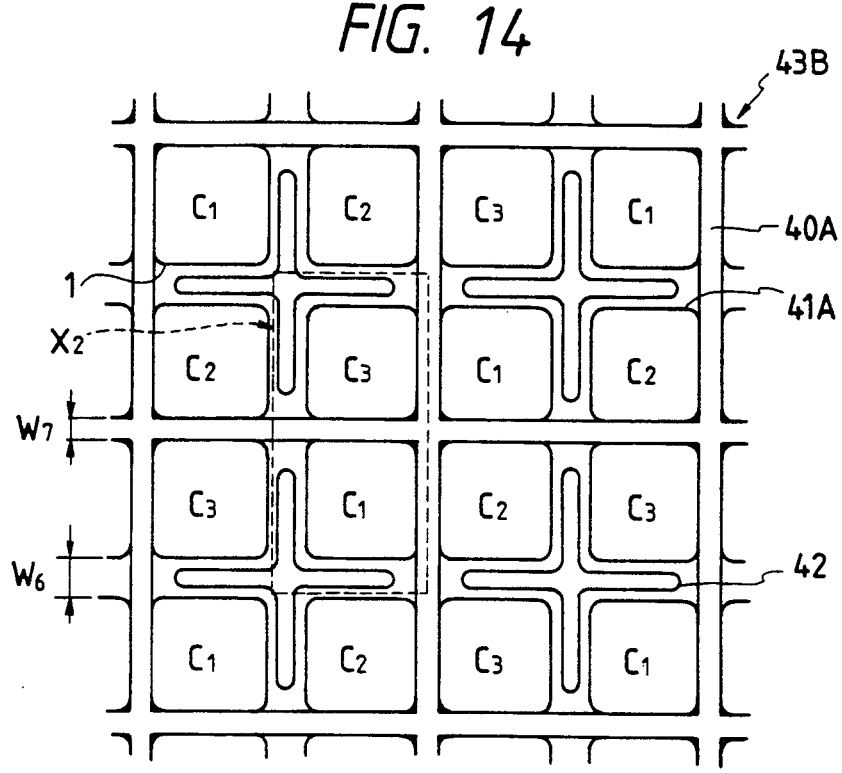
Figure 15:
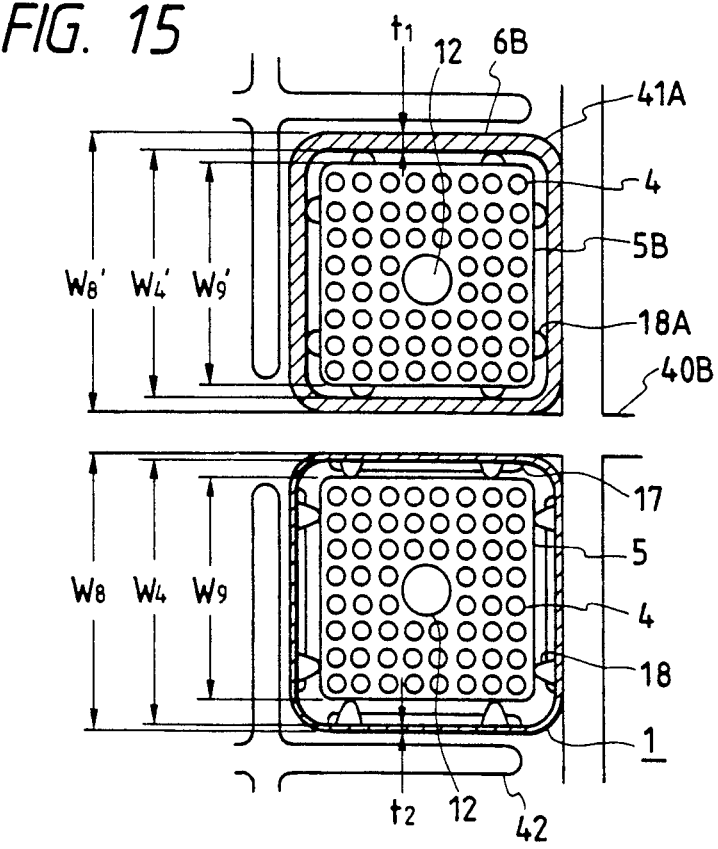
FIG. 15 is an enlarged view of an $x_2$ portion shown in FIG. 14.

Another embodiment of the core of the boliling water reactor to which the fuel assembly 1 is applied will be explained with reference to FIGS. 14 and 15. Reference numeral 40A represents the upper core grid plate and 41A does the conventional fuel assembly. The width of the grid of the upper core grid plate 40A is bigger than that of the upper core grid plate 40. The fuel assembly 41A has the channel box 6B whose sidewalls are straight. The width $W_4'$ of the channel box 6B is 132.46 mm. The width $W_9'$ of the fuel assembly 41A is smaller than that of the fuel assembly 41. The core construction in the fuel cycle ahead of the fuel cycle carried out by the core 43B of this embodiment is such that only the fuel assemblies 41A having different core residence time are disposed as the fuel assemblies in the same way as in FIG. 11. The used fuel assembly $C_3$ is withdrawn from this core and the new fuel assembly 1 having burnup of 0 GWd/t is loaded. This fuel exchange provides a core 43B. Here, the fuel assembly $C_1$ is the fuel assembly 1 and the fuel assemblies $C_2$ and $C_3$ are the fuel assemblies 41A. FIG. 15 shows in enlargement the $X_2$ portion in FIG. 14. The fuel assembly 41A has the same construction as the fuel assembly 41 except only that the width $W_4'$ of the channel box is smaller than that of the fuel assembly 41. In comparison with the channel box 6B, the channel box 6 used in the fuel assembly 1 of this embodiment increases the strength at the lower part and can reduce the neutron absorption quantity. The thickness $t_2$ of the channel box 6 is smaller than the thickness $t_1$ of the channel box 6B. For example, $t_1$ is 2.54 mm and $t_2$ is 2.00 mm.

The fuel assembly 1 and the fuel assembly 41A used for the core 43B will be compared. The width $W_8$ of the channel box 6 is substantially equal to the width $W_8'$ of the channel box 6B. They are substantially equal within the range of tolerance. Accordingly, the width $W_4$ of the channel box 6 is greater than the width $W_4'$ of the channel box 6B. The width $W_9$ of the fuel spacer 5 is equal to the width $W_9'$ of the fuel spacer 5B.

In the core 43B, the water gap width $W_6$ is equal to the water gap width $W_7$. These water gap widths are greater than the water gap widths $W_6$ and $W_7$ of the core 43. The core 43B has originally a high moderation effect of the neutron in the water gap. Therefore, this embodiment utilizes the decrement of the thickness obtained by reducing the thickness of the channel box 6 for increasing the area of the coolant passage inside the channel box 6. Accordingly, the coolant passage area inside the fuel assembly 1 is greater than that in the fuel assembly 41A. The pressure loss of the fuel assembly 1 becomes smaller than that of the fuel assembly 41A and thermal hydraulic stability inside the channel can be improved. The critical power of the fuel assembly 1 where $G_2/G_1$ becomes great can be made higher than that of the fuel assembly 41A.

Figure 16:
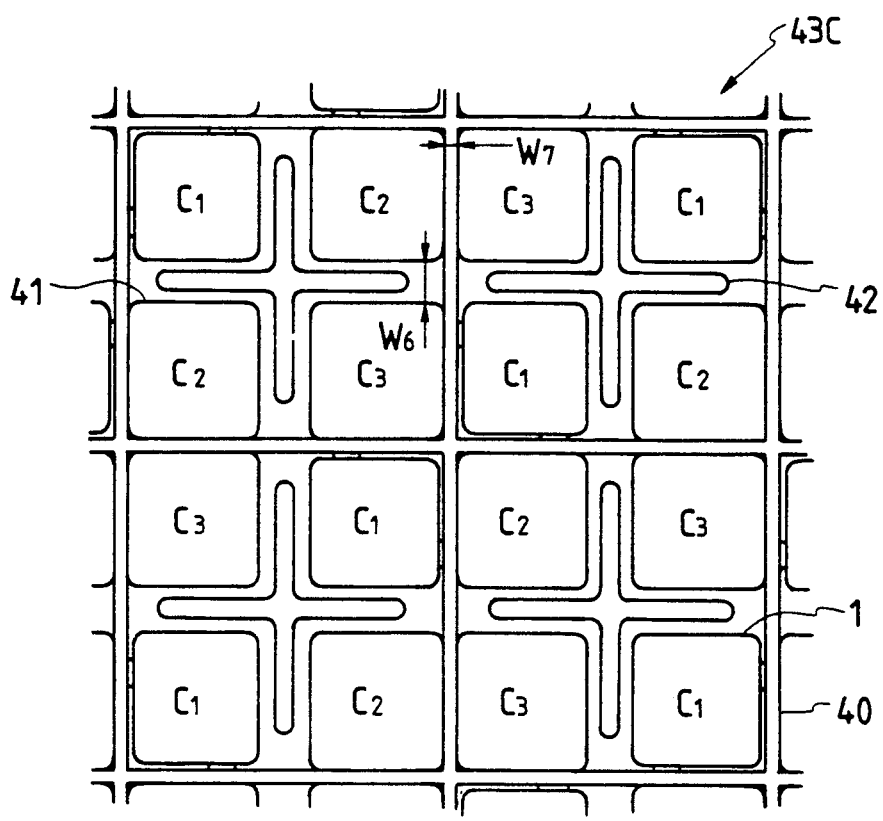

Another embodiment of the core of the boiling water reactor using the fuel assembly 1 will be explained with reference to FIG. 16. The core 43C of this embodiment can be obtained by withdrawing the fuel assembly 41 as the fuel assembly $C_3$ and loading the fuel assembly 1 having burnup of 0 GWd/t in the same way as when the core 43A (FIG. 12) is obtained from the core 43 (FIG. 11). In the core 43C, the fuel assemblies $C_2$ and $C_3$ are the fuel assemblies 41 equipped with the channel box 6A and the fuel assembly $C_1$ is the fuel assembly 1. The cross-section of each fuel assembly 1, 41 has the structure shown in FIG. 13. The difference between the core 43C in which all the fuel assemblies are the fuel assemblies 41 and the core 43 shown in FIG. 11 is that the water gap width $W_6$ of the core of the former is greater than the water gap $W_7$. In the fuel assembly 1 used in this embodiment, the center O (FIG. 5) of the insertion portion 3A (FIG. 2) is deviated by $\sqrt{2}(t_2-t_1)$ from the axis of the fuel supporting portion 3B (FIG. 2) on the diagonal line of the lower tie plate 3 extending to the control rods 42 in this cell. The axis of the fuel supporting portion 3B is in agreement with the axis of the fuel assembly 1. Insertion of the insertion portion 3A of such a fuel assembly 1 into a fuel supporting fixture (not shown) makes greater the water gap width $W_6$ between the fuel assembly 1 and the fuel assembly 41A than the width $W_6$ between the fuel assemblies 41A. However, the water gap width $W_7$ between the fuel assembly 1 and the fuel assembly 41A is equal to the width $W_7$ between the fuel assemblies 41A.

The neutron utilization ratio of the core 43C can be improved because the neutron absorption quantity of the channel box is reduced. Moreover, since the narrow gap width $W_6$ can be enlarged by loading of the fuel assembly 1 into the core 43C, reactivity of the fuel assembly on the narrow water gap side can be improved, so that the difference of reactivity can be reduced between the portion of the fuel assembly facing the wide water gap and the portion facing the narrow water gap.

The fuel assemblies 41 and 41A that have been loaded conventionally into different types of cores of the boiling water reactor have different fuel bundles and different sizes of channel boxes. However, when the fuel assembly 1 shown in FIG. 1 is used, the fuel bundle can be used in common for the cores 43A–43C. This can be accomplished by the employment of the channel box having the support tabs 18. In the fuel assembly 1 that is loaded so as th correspond to the cores 43A, 43b and 43C, the size of the fuel bundle or in other words, the width of the upper tie plate 2, the outer diameter and pitch of the fuel rods 4 and the width of the fuel spacer 5 are substantially the same. Therefore, it is no longer necessary to produce separately the fuel bundles for the cores 43A–43c, respectively, and production and management of the fuel bundle become extremely easy.

It is also possible to load the fuel assembly 1A shown in FIG. 9 in place of the fuel assembly 1 and to constitute the core 43A–43C.

Figure 19:
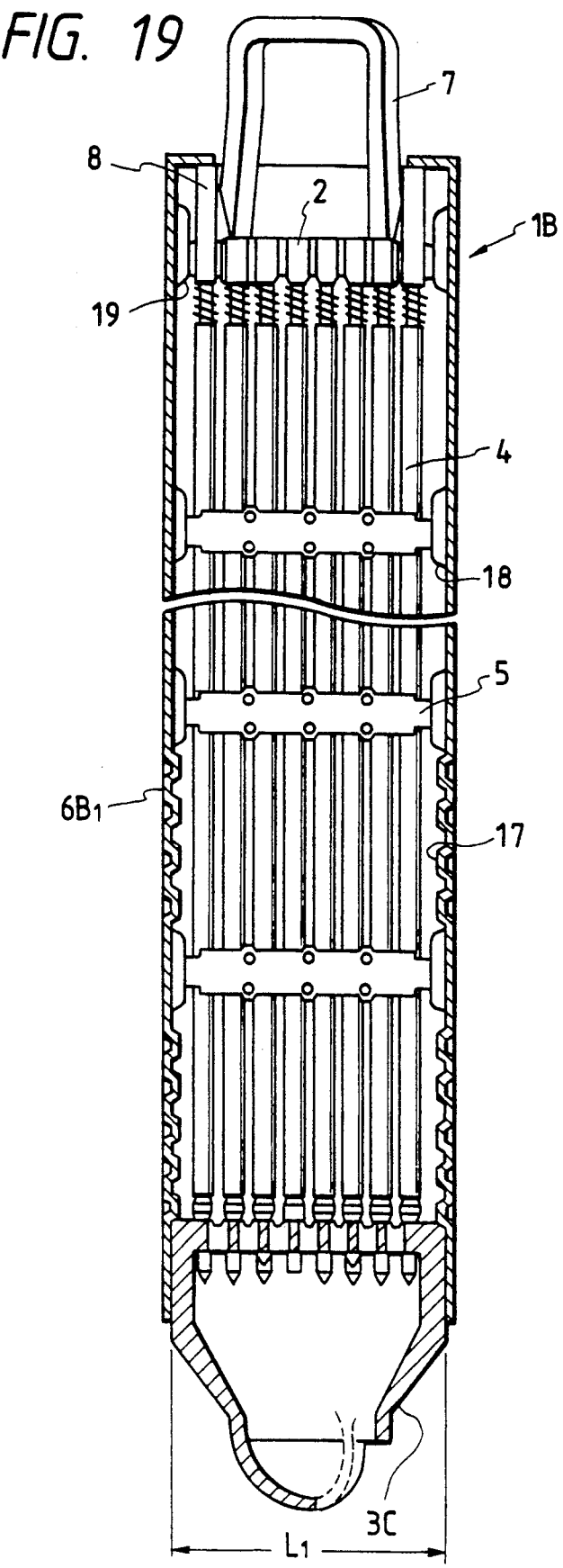

FIG. 19 shows the fuel assembly 1B in accordance with still another embodinent of the present invention. The fuel assembly 1B has the same structure as the fuel assembly 1 shown in FIG. 1 except for the structure of the lower end portion of the channel box and sidewalls of the lower tie plate. In the channel box $6B_1$, the reinforcing tabs 17 are disposed at the portion ranging from the upper surface of the lower tie plate 3C to the second fuel spacer. Each sidewall is straight from below the upper surface of the lower tie plate 3C in the axial direction in the channel box $6B_1$. The lower tie plate 3C does not have the grooves 22 on the outer side surface of its sidewalls. The fuel assembly 1B provides the same effect as that of the fuel assembly 1 shown in FIG. 1. when the fuel rods 4 gets elongated in the axial direction and the upper tie plate 2 is lifted up during the operation of the reactor, the lower end of the channel box $6B_1$ moves up, as well. In this case, the lowermost reinforcing tabs 17 leave the upper surface of the lower tie plate 3C. However, outward creep deformation of the straight portion of the channel box $6B_1$ that is positioned below the lowermost reinforcing tabs 17 is by far smaller than in the prior art due to the functions of the reinforcing tabs 17. This creep deformation is greater than that of the channel box 6 shown is FIG. 1.

Figure 20:
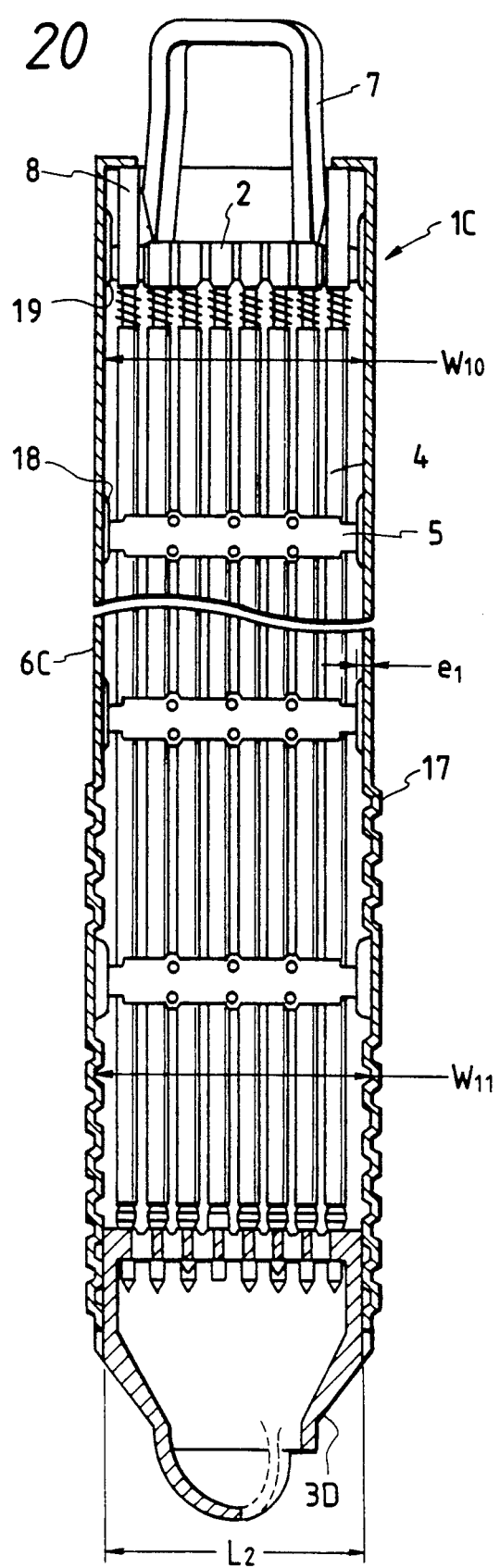

FIG. 20 shows the fuel assembly 1C in accordance with another embodiment of the present invention. The fuel assembly 1C is equipped with the channel box The channel box 6C has the tabs 17, 18 and 19 in the same way as the channel box 6. The reinforcing tabs 17 are formed by projecting outward the sidewalls of the channel box. In order not to impede insertion of the control rods, the width $W_{11}$ between the inner surfaces of the opposed reinforcing tubs 17 is equal to the width $W_4$ of the channel box 6. Therefore, the width $W_{10}$ between the opposed inner surfaces of the channel box 6C is smaller than the width $W_4$ but is equal to the width $W_5$ (FIG. 2). Under this relationship the width $L_2$ between the outer side surfaces of the opposed sidewalls of the lower tie plate 3D is smaller than the width $L_1$ of the lower tie plate 3C described above. The height $e_1$ of the tabs 18, 19 from the inner surface of the channel box 6C in this embodiment is smaller than the height e of the channel box 6.

This embodiment provides the same effect as that of the fuel assembly 1 shown in FIG. 1. However, in this embodiment the gap between the fuel rods 4 positioned at the outermost periphery and the inner surface of the channel box 6C is small throughout the full length in the axial direction. Therefore, the pressure loss becomes greater than in the fuel assembly 1 and channel stability becomes lower than in the prior art fuel assembly. When these fuel assemblies 1C are positioned into the core, however, the water gap width between the adjacent fuel assemblies becomes greater at the upper part of the fuel assemblies. As a result, core stability of the core using the fuel assemblies 1C can be improved.

The cores 43A-43C can be constituted by using the fuel assemblies 1B or 1C in place of the fuel assemblies 1.

Other examples of the channel boxes 6 to be fitted to the fuel assembly 1 are shown in FIGS. 21-25. These channel boxes can be applied to each of the fuel assemblies 1A-1C The channel box 6D shown in FIG. 21 has the spacer support tabs 18B formed by connecting each tab 18 positioned above the spacer support tubs 18 for supporting the second fuel spacer in the channel box 6. The spacer support tab 18 improves rigidity of the channel box 6D to the bending stress in the axial direction. The channel box exhibits the same function as the channel box 6.

The channel box 6E shown in FIG. 22 has the spacer support tabs 18c formed by extending the spacer support tabs 18B described above from the upper end to lower end of the channel box. Besides the function obtained by the channel box 6, this channel box 6E has the function of improving the strength to the bending stress in the axial direction and buckling.

In the channel box 6F shown in FIG. 23, the spacer support tabs 18D for supporting the first and second fuel spacers are transversely thin in the same way as the reinforcing tabs 17. The spacer support tabs 18 for supporting the fuel spaces at a higher level than the second fuel spacer are thin in the axial direction. The resistance of the channel box 6F to creep deformation is increased by the spacer support tabs 18D. However, cooling water hardly flows between the fuel spacer 5 and the channel box 6F at the level of disposition of the spacer support tabs 18D. The pressure loss of the fuel assembly equipped with this channel box 6F becomes somewhat greater than that of the fuel assembly equipped with the channel box 6. The pressure loss at the lower part of the fuel assembly (particularly at the portion below the second fuel spacer) is smaller than that at the gas-liquid two phase portion at the upper part of the fuel assembly. Accordingly, when the pressure loss of the fuel assembly is considered as a whole, disposition of the spacer support tabs 18D does not provide extremely large fluid resistance.

The channel box 6G shown in FIG. 24 has groove-like reinforcing tabs 17A that continue throughout the entire periphery. These reinforcing tabs 17A improves remarkably the inhibition effect of outward creep deformation of the channel box 6G. The channel box 6G has the function of the channel box 6, too.

The channel box 6H shown in FIG. 25 is produced by disposing the tabs 17, 18 and 19 to the channel box having the thick corner portions 46 of Japanese Patent Publication No. 13075/1989. This channel box 6H has the functions of both of the channel box 6 and channel box of Japanese Patent Publication No. 13075/1989. The strength of the channel box 6H at the reduced thickness portion at the center of its sidewalls can be increased remarkably by the reinforcing tabs 17 disposed at that portion, and the thickness of the reduced thickness portion can be further reduced.

Since the thickness of the corner portions is thick in this channel box 6H, however, the neutron absorption quantity is greater as much than is the channel box 6 shown in FIG. 1. In the channel box 6H, the width $W_8$ (FIG. 13) of the channel box 1 is the gap $W_{12}$ between the outer side surfaces of the thick corner portions 6H.

The reinforcing tabs 17 disposed on the channel box may be replaced by the solid reinforcing tabs 17B as shown in FIG. 26. The shape of the reinforcing tabs 17B defines the corrugated portion on the sidewalls of the channel box. The channel box having the reinforcing tabs 17B has the same function as that of the channel box 6. However, the channel box of the former has a greater neutron absorption quantity than that of the latter. Since the reinforcing tabs 17B exist below the second fuel spacer, the neutron absorption quantity at the lower part of the fuel assembly increases and the power distribution of the fuel assembly in the axial direction can be made flat. The support tabs 18 and 19 may be made solid in the same way as the reinforcing tabs 17B. However, the same problem with the reinforcing tabs 17B occurs, as well.

FIG. 27 shows the fuel assembly 1D in accordance with still another embodiment of the present invention. The fuel assembly ID has the channel boxes 6I and the fuel spacer 5C. The structure of this fuel assembly other than these two structures is the same as that of the corresponding portion of the fuel assembly 1. The channel box 6I is equipped with the reinforcing tabs 17 and the support tabs 19 but is not equipped with the support tabs 18. The fuel spacer 5C is formed by disposing support springs 47 to the band 15 of the fuel spacer 5. The support spring 47 comes into contact with the inner surface of the channel box 6I and limits the movement of the fuel spacer 5C in the transverse direction. Whenever the reinforcing tabs 17 pass through the fuel spacer 5C at the time of fitting of the channel box 6I, the support spring 47 is pushed to the band of the fuel spacer 5C. The support spring 47 does not raise any problem at the time of fitting of the channel box 61 and the channel box 61 can be fitted easily to the fuel bundle.

The fuel assembly 1D provides the same effect as the fuel assembly 1. However, since the fuel assembly 1D is equipped with the support spring 47, the oscillation of the fuel spacer in the transverse direction becomes somewhat greater than in the fuel assembly 1 at the time of earthquake.

Figure 29:
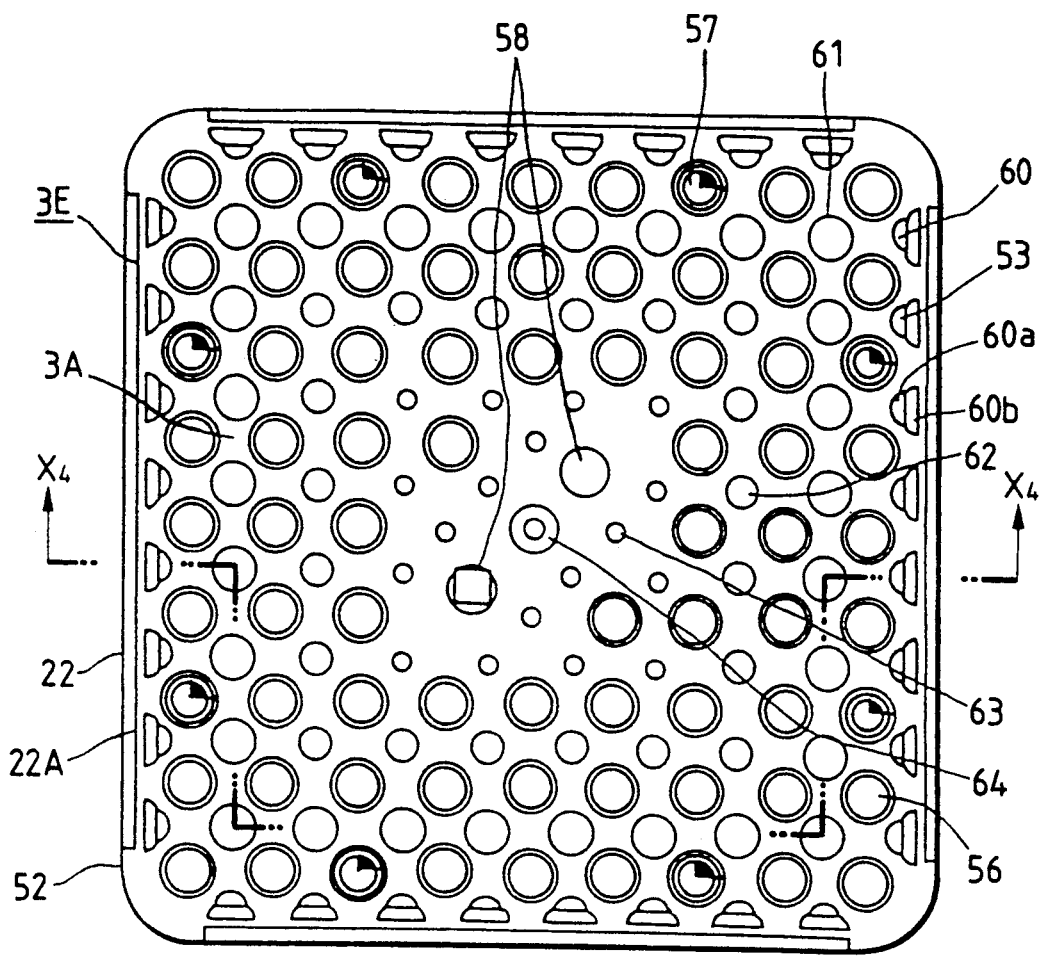
FIG. 29 is a plan view of the lower tie plate shown in FIG. 28.
Figure 28:
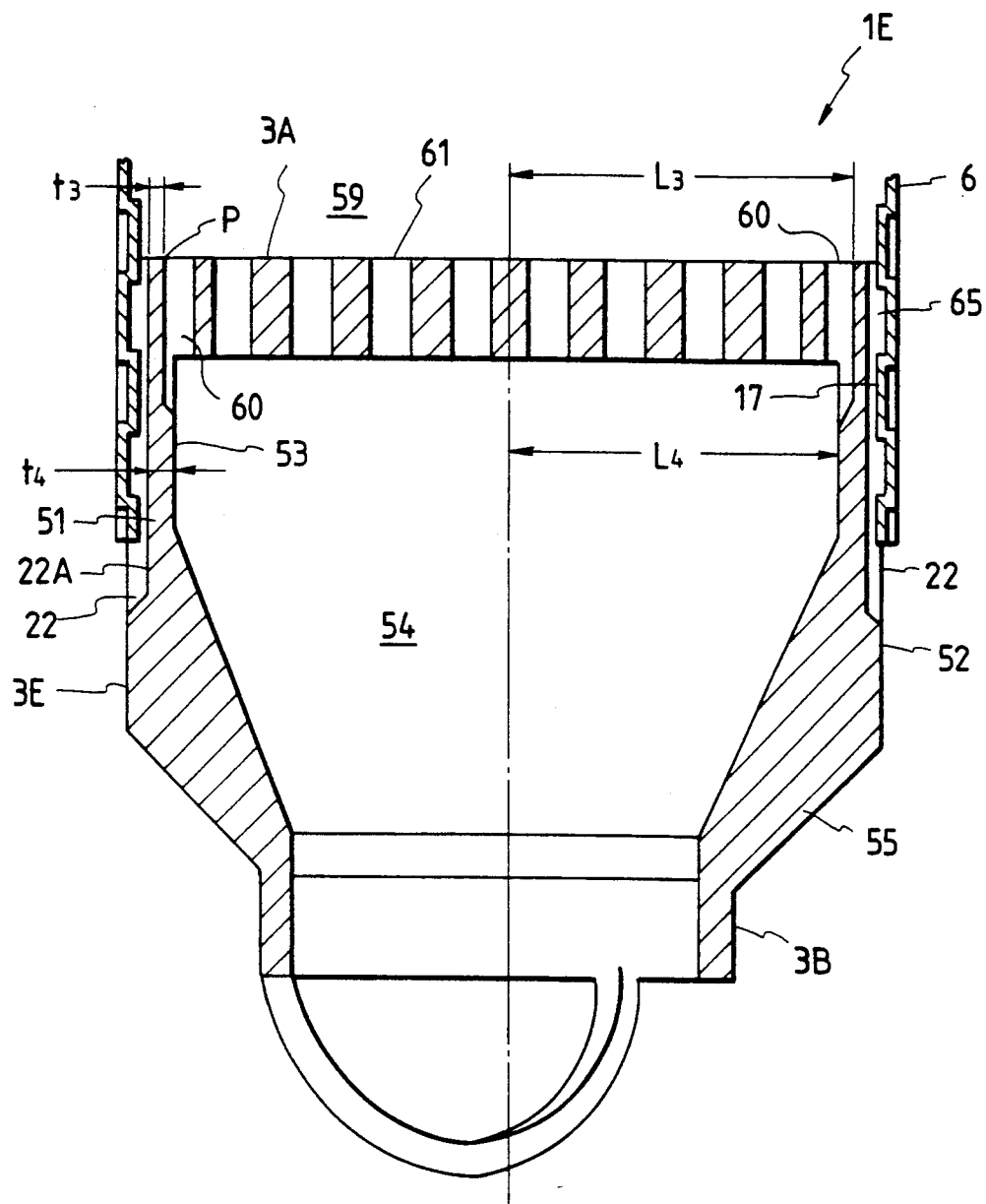
FIG. 28 is a longitudinal sectional view of the fuel assembly is accordance with still another embodiment of the present invention near a lower tie plate.

Other examples of the fuel assembly are shown in FIGS. 28 and 29. These drawings show the structure of the fuel assembly 1E of this embodiment near the lower tie plate. The rest of the structure are the same as those of the fuel Assembly 1A. The fuel assembly 1E is produced by adding the function of the jet stream described in Japanese Laid-Open No. 212391/1989 to the fuel assembly 1A.

The lower tie plate 3E includes a fuel support portion 3A, a cylindrical sidewall portion 51 which has inner side surfaces 53 for defining four outer side surfaces 52 as the side surfaces of the lower tie plate 3E and inner space 54, has a square cross-section and continues the fuel support portion 3A, and a nozzle portion 55 which continues the cylindrical sidewall portion 51 and guides the coolant into the inner space 54. The grooves 22 shown on FIG. 1 are disposed on the outer side surfaces 52 side of the cylindrical sidewall portion 51. Several reinforcing tabs 17 are inserted into the grooves 22.

As shown in FIG. 29, the fuel supports portion 3A includes fuel rod fitting holes 56 into which the lower end of the fuel rods 4 is fitted, connecting fuel rod fitting holes 57 and water rod fitting holes 58 into which the lower end of each water rod 12A is fitted. Furthermore, the fuel support portion 3A includes coolant supply holes 60, 61, 62, 63, 64 for guiding cooling water supplied into the inner space 54 above the fuel support portion 3A or in other words, for guiding cooling water into the coolant passage 59 inside the channel box 6, which are disposed between the fitting holes 56, 57, 58. These cooling water supply holes have mutually different cross-sectional areas. The cooling water supply hole 60 at the outermost periphery among these cooling water supply holes forms flow path means for generating the flow of a coolant that inhibits leakage of cooling water from the gap (coolant passage 65) defined between the channel box 6 and the lower tie plate 3E when the fuel assembly 1E is loaded into the core. Hereinafter, the coolant flow that flows out from the cooling water supply hole 60 will be referred to as the "jet flow".

The cooling water supply hole 60 has an inside portion 60a which penetrates through the portion of the fuel support portion 3A which is positioned more inward than the inner side surface 53 of the cylindrical sidewall portion 51 and an outside portion 60b which is positioned more outward than the inner side surface 53, comes into the cylindrical sidewall portion 51 and is open to the inner side surface 53. Accordingly, the inner side surface 53 can be seen through the cooling water supply hole 60 as shown in FIG. 29.

The cooling water supply hole 60 is constituted in the following way. In FIG. 28, the distance $t_3$ between the point P which is positioned on the side of the outer side surface 52 of the lower tie plate 3E on the inner peripheral surface of the outlet of the cooling water supply hole 60 (the portion of the inner peripheral surface which is the nearest to the outer side surface 52) and the bottom surface 22A of the groove 22 (the outer side surface 52 of the lower tie plate when the groove 22 does no exist such as the lower tie plate 3C shown in FIG. 19 and the lower tie plate 3D shown in FIG. 20) is smaller than the thickness $t_4$ of the cylindrical side wall portion 51 of the lower tie plate 3E (the dimension between the bottom surface 22A and the inner side surface 53 when the groove 22 is disposed in the lower tie plate and the dimension between the outer side surface 52 and the inner side surface 53 when the groove 22 does not exist in the lower tie plate). In other words, the point P is positioned closer to the outer side surface 52 than the inner side surface 53 of the cylindrical sidewall portion 51. It can be said that the distance $L_3$ between the point P of the outlet of the cooling water supply hole 60 and the center axis of the lower tie plate 3E is greater than the distance $L_4$ between the inner side surface 53 of the lower tie Plate 3E and the center axis of the lower tie plate 3E. Furthermore, it can be said that part of the cooling water supply hole 60 is positioned more outward (closer to the outer side surface 52) than the fuel rod insertion holes (the fitting holes 56 and 57) into which the lower end of each fuel rod 4 positioned at the outermost periphery among the fuel rods 4 is inserted. The cooling water supply holes 60 may be positioned as a whole more outward than the fuel rod insertion holes described above.

In order to improve further the leak inhibition function of cooling water and the seal effect by the jet flow, it is very important to increase maximum the total flow passage area of the cooling water supply holes 61 existing at the outer peripheral portion and to contract the total flow passage sectional area of the inner supply holes 62, 63, 64. (For detail, refer to the description on page 20, lines 11-23 of the specification of U.S. patent application Ser. No. 464,151 (filed on Jan. 12, 1990) and page 18, line 9-page 21, line 23 of the specification of European Patent Application No. 90300272.3)).

During the operation of the boiling water reactor, cooling water is guided into the channel box 6 of the fuel assembly 1E through the cooling water supply holes 60-64. Most of cooling water rises in the coolant passage 59 inside the channel box 6. Part of cooling water leaks outside the fuel assembly 1E through the coolant passage 65. The leaking quantity of this cooling water is limited by the jet flow which is jetted from the outer peripheral portion of the lower tie plate 3E to the inner surface of the channel box 6. The reason will be explained next. Since the cooling water supply holes 60 are disposed, the flow rate of cooling water increases near the channel box 6 much more in this embodiment than in the conventional apparatus. In this embodiment having such a flow rate distribution of cooling water, a low pressure region is formed by the action of the jet flow near the inner surface of the channel box 6 below the jet flow flowing out from the cooling water supply holes 60 of the outermost periphery, that is, near the inlet portion of the coolant passage 65. Accordingly, leak of cooling water inside the channel box 6 to the outside through the coolant passage 65 can be inhibited.

Figure 30:
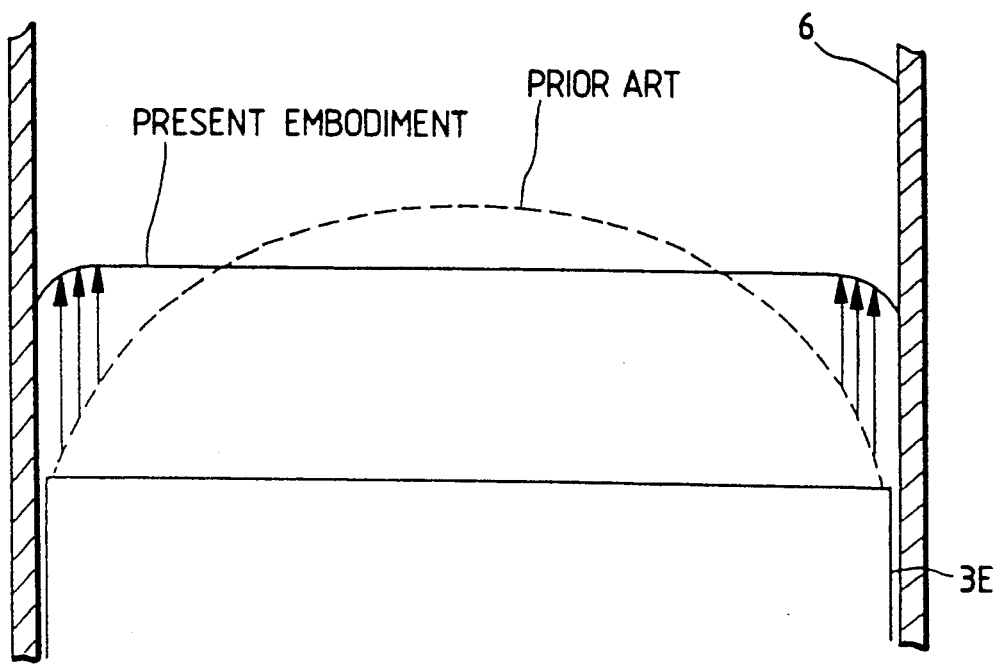
FIG. 30 is a diagram showing a flow velocity distribution on the upper surface of the lower tie plate of FIG. 28.

The effect of the jet flow can be made further effective by bringing the outlet of the cooling water supply holes 60 of the outermost periphery close to the bottom surface 22A of the groove 22 of the lower tie plate 3E (or to the outer side surface 52) and point P is close to the outer side surface 52) and distributing each flow path sectional area of the cooling water supply holes 61-64 so that the total flow path sectional area of the outer peripheral portion is greater than the total flow path sectional area at the center. The effect of inhibiting the leakage of cooling water or the seal effect by the jet flow can be further improved by increasing the flow path sectional area of the supply holes at the outer peripheral portion of the lower tie plate while decreasing the flow path sectional area of the supply holes at the center. Furthermore, such a definition of the flow path sectional area of the supply holes provides the effect of making flat the flow velocity distribution inside the fuel assembly 1E after leaving the lower tie plate 3E much more than in the prior art example as shown in FIG. 30.

In this embodiment, in particular, the width of the portion positioned outside the fuel rod insertion holes 56 at the outermost periphery (the outside portion 60b) in the direction in parallel with the bottom surface 22A of the groove 22 (or with the outer side surface 52) is greater than the width of the portion (the inside portion 60a) positioned in the region between the fuel rod insertion holes positioned at the outermost periphery in the same direction. Therefore, the jet flow can be supplied substantially uniformly throughout the entire periphery of the inner surface of the channel box 6 except for its corner portions. This is effective for reducing the flow rate of leaking cooling water.

This embodiment can limit the flow rate of leaking cooling water from the coolant passages 65 by the jet flow and can obtain the same effect as that of the fuel assembly 1. Particularly because the channel box having the reinforcing tabs 17 at its lower end portion and the jet flow are used in combination, the flow rate of leaking cooling water can be limited extremely. Accordingly, the finger springs that have been disposed conventionally in the coolant passage 65 for limiting the flow rate of leaking cooling water become unnecessary.

The fuel assembly 1E can be loaded into any of the cores 43A-43C in place of the fuel assembly 1. The cooling water supply hole 60 of the fuel assembly 1E can be applied to the lower tie plate of each of the fuel assemblies 1B, 1C and 1D.

The present invention can increase remarkably the strength of the channel box in comparison with the prior art and can remarkably inhibit creep deformation of the channel box. In other words, the present invention can prolong the residence time of the channel box inside the core as much. The present invention makes it possible to use in common the structures of the fuel assemblies to be loaded into different types of cores other than the channel box for different types of cores.

What is claimed is:

1. A fuel assembly including a lower tie plate, a plurality of fuel rods having the lower end thereof supported by said lower tie plate, fuel spacers for maintaining gaps between said fuel rods, and a channel box having creep deformation inhibition portions formed on the sidewalls thereof and encompassing said fuel spacers, characterized in that said channel box has fuel spacer support means projecting inwardly from an inner surface of said channel box and supporting said fuel spacers in a direction transverse to an axial direction of the fuel assembly.

2. A fuel assembly according to claim 1, wherein said fuel spacer support means includes projections formed by projecting inwardly part of the inner surface of the sidewalls of said channel box.

3. A fuel assembly according to claim 1, wherein said fuel spacer support means includes projections that extend thinly in the axial direction.

4. A fuel assembly according to claim 1, wherein said lower tie plate is equipped on the outer side surface of each sidewall thereof with recesses extending downward from its upper surface, and said creep deformation inhibition portions are fitted into said recesses of said lower tie plate.

5. A fuel assembly according to claim 1, wherein the height of said fuel spacer support means in said axial direction is greater than the height of said creep deformation inhibition portions.

6. A fuel assembly according to claim 1, wherein said creep deformation inhibition portions are formed at the lower part of said channel box, and the gap width between the inner surface of the straight portion of the sidewall of said channel box at the upper part of said fuel assembly and said fuel rods positioned at the outermost periphery is greater than the width between the inner surface of said creep deformation inhibition portions at the lower part of said fuel assembly which is the closest to said fuel rods, and said fuel rods at the outermost periphery.

7. A fuel assembly according to claim 1, wherein said fuel spacer support portions are disposed near the corners of said channel box.

8. A fuel assembly including a lower tie plate, a plurality of fuel rods having the lower end thereof supported by said lower tie plate, fuel spacers for maintaining gaps between said fuel rods, and a channel box encompassing at least said fuel spacers, characterized in that said lower tie plate is equipped on the outer surface side of each sidewall thereof with recesses extending downward from the upper surface of said lower tie plate, and a width between mutually opposed parts of said fuel spacers which come into contact with said channel box when said channel box is fitted thereon is smaller than a width between said receses which are opposite each other.

9. A fuel assembly according to claim 8, wherein said spacer support portions are disposed near the corners of said channel box.

10. A fuel assembly including an upper tie plate, a lower tie plate, a plurality of fuel rods having both end portions thereof supported by said upper and lower tie plates, fuel spacers for maintaining gaps between said fuel rods, and a channel box having creep deformation inhibition portions formed on the sidewalls thereof, characterized in that said channel box has fuel spacer support means projecting inwardly from an inner surface of said channel box and supporting said fuel spacers in a direction transverse to an axial direction of the fuel assembly, and tie plate support means projecting inwardly from the inner surface of the channel box and supporting said upper tie plate in said transverse direction.

11. A fuel assembly according to claim 10, wherein said fuel spacer support means includes projections formed by projecting inwardly part of the inner surface of sidewalls of said channel box.

12. A fuel assembly according to claim 10, wherein said fuel spacer support means includes projections extending thinly in the axial direction.

13. A fuel assembly according to claim 10, wherein said fuel spacer support means are disposed near the corners of said channel box.

14. A fuel assembly according to claim 10, wherein said lower tie plate has recesses extending downward from its upper surface on the outer surface side of each of its sidewalls, and said creep deformation inhibition portions are fitted into said recesses of said lower tie plate.

15. A fuel assembly according to claim 10, wherein the height of said fuel spacer support means in said axial direction is greater than the height of said creep deformation inhibition portions.

16. A fuel assembly including an upper tie plate, a lower tie plate, a plurality of fuel rods having both end portions thereof supported by said upper and lower tie plates, fuel spacers for maintaining gaps between said fuel rods, and a channel box for encompassing the fuel spacers and said upper and lower tie plates characterized in that said lower tie plate has recesses extending downward from its upper surface on the outer side surface of each of its sidewalls, and a width between mutually opposed parts of said fuel spacers which come into contact with said channel box when said channel box is fitted thereon and a width between mutually opposed outer surfaces on the sidewalls of said upper tie plate which come into contact with said channel box are smaller than a width between said recesses which are opposite each other.

17. A fuel assembly according to claim 16, further comprising tie plate support means including projections formed by projecting inwardly part of an inner surface of the sidewall of said channel box.

18. A fuel assembly according to claim 17, wherein said tie plate support means includes projections extending thinly in the axial direction.

19. A fuel assembly including:
a plurality of fuel rods;
a lower tie plate holding the lower end portions of said fuel rods and having a plurality of coolant supply holes for guiding a coolant between said fuel rods;
fuel spacers for maintaining gaps between said fuel rods; and
a channel box having creep deformation inhibition portions formed of the sidewalls thereof, and encompassing at its lower end said lower tie plate and thereby forming an coolant leak passage with, and between, said lower tie plate; wherein said channel box has fuel spacer support means that project inwardly from an inner surface of said channel box and supports said fuel spacers in a direction transverse to an axial direction of the fuel assembly, and means for generating a coolant flow for inhibiting coolant leak from said coolant leak passage inclusive of said coolant holes positioned at the outermost periphery among said coolant holes being provided to said lower tie plate.

20. A fuel assembly including a lower tie plate, a plurality of fuel rods having the lower end portions thereof supported by said lower tie plate, fuel spacers for maintaining gaps between said fuel rods, and a channel box having creep deformation inhibition portions formed on the sidewalls thereof and encompassing said fuel spacers, characterized in that said fuel spacers are equipped on the spacer sidewalls with resilient members coming into contact with the inner surface of said channel box and supporting said fuel spacers in a direction transverse to an axial direction of the fuel assembly.

21. A channel box including creep deformation inhibition portions formed at the lower part of sidewalls thereof and a plurality of fuel spacer support portions projecting inwardly from the inner surface of the sidewalls.

22. A channel box according to claim 21, further comprising a plurality of tie plate support means projecting inwardly from the inner surface of the sidewalls, for supporting an upper tie plate are provided at the upper end portion of the sidewalls.

23. A channel box according to claim 21, wherein said spacer support portions are capable of supporting a plurality of fuel spacers in a direction transverse to an axial direction and extend thinly in the axial direction and are provided at the upper part of said sidewalls.

24. A channel box according to claim 21, wherein said fuel spacer support portions extend from the lower end to an upper part of said sidewalls.

25. A production method of a channel box characterized in that two U-shaped members are coupled to form a cylinder member and then part of the sidewalls of said cylinder member is projected inwardly from an inner surface of said cylinder member to form a fuel spacer support portion.

26. A production method of a channel box according to claim 25, wherein corrugated portions which are resistant to creep deformation are formed on said sidewalls with the formation of said fuel spacer support portions.

27. A production method of a channel box according to claim 26, wherein said cylinder member having said fuel spacer support portions formed therein is heated to an annealing temperature so as to effect pipe expansion molding.

28. A core of a nuclear reactor comprising:
a plurality of first fuel assemblies; and
a plurality of second fuel assemblies;
each of said first fuel assemblies including:
a plurality of fuel rods, first fuel spacers for maintaining gaps between said fuel rods and a first channel box encompassing said first fuel spacers, whereby said first fuel spacers have spacer support means projecting outwardly from an outer surface of said first fuel spacers and come into contact with the inner surface of said first channel box and support said first fuel spacers in a direction transverse to an axial direction;
each of said second fuel assemblies including:
a plurality of fuel rods, second fuel spacers for maintaining gaps between said fuel rods, and a second channel box having spacer support means projecting inwardly from an inner surface of said second channel box and supporting said second fuel spacers in the direction transverse to the axial direction.

29. A core of a nuclear reactor according to claim 28, wherein the thickness of said second channel box is smaller than that of said first channel box.

30. A core of a nuclear reactor according to claim 28, wherein a width between the outer surfaces of opposed sidewalls of said second channel box is smaller than the corresponding width of said first channel box and the thickness of said second channel box is smaller than that of said first channel box.

31. A core of a nuclear reactor according to claim 30, wherein the width between the outer surfaces of mutually opposed second sidewalls of said second fuel spacer, which are adjacent to said second channel box, is smaller than the corresponding width of mutually opposed first sidewalls of said first fuel spacer, which are adjacent to said first channel box.

32. A core of a nuclear reactor according to claim 30, wherein said first fuel assembly includes a first lower tie plate having a first insertion portion inserted into a fuel support fixture, said second fuel assembly includes a second lower tie plate having a second insertion portion inserted into a fuel support fixture, the axis of said first insertion portion is in agreement with the axis of said first fuel assembly and the axis of said second insertion portion is deviated from the axis of said second fuel assembly toward a control rod inserted between said first and second fuel assemblies.

33. A core of a nuclear reactor according to claim 28, wherein a width between the inner surfaces of mutually opposed sidewalls of said second channel box is greater than the corresponding width of said first channel box and the thickness of said second channel box is smaller than that of said first channel box.

* * * * *